United States Patent
Lee et al.

(10) Patent No.: US 12,550,166 B2
(45) Date of Patent: *Feb. 10, 2026

(54) SCRAMBLING OF PHYSICAL BROADCAST CHANNEL (PBCH)

(71) Applicant: Apple Inc., Cupertino, CA (US)

(72) Inventors: Dae Won Lee, Portland, OR (US); Seunghee Han, San Jose, CA (US); Gregory Vladimirovich Morozov, Nizhny Novgorod (RU); Alexei Vladimirovich Davydov, Nizhny Novgorod (RU); Yongjun Kwak, Portland, OR (US)

(73) Assignee: Apple Inc., Cupertino, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/825,035

(22) Filed: May 26, 2022

(65) Prior Publication Data

US 2022/0330208 A1 Oct. 13, 2022

Related U.S. Application Data

(63) Continuation of application No. 16/632,416, filed as application No. PCT/US2018/043831 on Jul. 26, 2018, now Pat. No. 11,375,475.

(Continued)

(51) Int. Cl.
*H04W 72/30* (2023.01)
*H04J 11/00* (2006.01)
(Continued)

(52) U.S. Cl.
CPC ......... *H04W 72/30* (2023.01); *H04J 11/0079* (2013.01); *H04L 1/0061* (2013.01);
(Continued)

(58) Field of Classification Search
CPC ............. H04W 72/005; H04W 56/001; H04W 72/0466; H04J 11/0079; H04J 13/0029; H04L 1/0061; H04L 1/1642; H04L 1/004
(Continued)

(56) References Cited

U.S. PATENT DOCUMENTS

2009/0046646 A1* 2/2009 Cho ...................... H04L 5/0053
370/329
2009/0149207 A1 6/2009 Zhang
(Continued)

FOREIGN PATENT DOCUMENTS

| CN | 101473581 | 7/2009 |
| CN | 103199953 | 7/2013 |

(Continued)

OTHER PUBLICATIONS

Extended European Search Report for Patent Application No. EP 18838569; Mar. 3, 2021. 8 Pages.
(Continued)

*Primary Examiner* — Derrick W Ferris
*Assistant Examiner* — Won Jun Choi
(74) *Attorney, Agent, or Firm* — Kowert, Hood, Munyon, Rankin & Goetzel, P.C.

(57) ABSTRACT

A user equipment (UE) can include processing circuitry configured to decode physical broadcast channel (PBCH) information received from a base station (BS). The decoded PBCH information includes a scrambled PBCH payload and an unscrambled bit sequence. A scrambling sequence is generated based on time information signaling within the unscrambled bit sequence. The scrambled PBCH payload is de-scrambled using the scrambling sequence, to obtain master information block (MIB) information. System information block (SIB) information is decoded based on the MIB information. The decoded PBCH information includes (Continued)

cyclic redundancy check (CRC) information. The scrambled PBCH payload and the unscrambled bit sequence can be verified based on the CRC information. The time information signaling includes one or more bits of a system frame number (SFN).

20 Claims, 30 Drawing Sheets

Related U.S. Application Data

(60) Provisional application No. 62/537,611, filed on Jul. 27, 2017.

(51) Int. Cl.
| | | |
|---|---|---|
| *H04L 1/00* | (2006.01) | |
| *H04L 1/1607* | (2023.01) | |
| *H04W 56/00* | (2009.01) | |
| *H04W 72/044* | (2023.01) | |

(52) U.S. Cl.
CPC ......... *H04L 1/1642* (2013.01); *H04W 56/001* (2013.01); *H04W 72/0466* (2013.01)

(58) Field of Classification Search
IPC ............................ H04L 1/0061; H04W 72/005
See application file for complete search history.

(56) References Cited

U.S. PATENT DOCUMENTS

| | | |
|---|---|---|
| 2011/0255631 A1 | 10/2011 | Pi |
| 2012/0076043 A1* | 3/2012 | Nishio .................. H04L 1/1861 370/252 |
| 2012/0198305 A1 | 8/2012 | Abu-Surra et al. |
| 2014/0301296 A1 | 10/2014 | Vos |
| 2016/0242149 A1 | 8/2016 | Batra |
| 2017/0187488 A1* | 6/2017 | Rico Alvarino ...... H04L 1/0059 |
| 2017/0257188 A1* | 9/2017 | Taniguchi ............. H04L 1/1864 |
| 2017/0295551 A1* | 10/2017 | Sadiq .................. H04L 27/2613 |
| 2018/0167946 A1 | 6/2018 | Si et al. |
| 2018/0220426 A1 | 8/2018 | Rico Alvarino et al. |
| 2018/0227867 A1* | 8/2018 | Park ........................ H04L 5/005 |
| 2018/0234931 A1* | 8/2018 | Ly .......................... H04W 72/30 |
| 2018/0323803 A1* | 11/2018 | Palgy .................... H04L 1/0057 |
| 2019/0007892 A1* | 1/2019 | Sheik ..................... H04W 68/00 |
| 2019/0123951 A1 | 4/2019 | Wang et al. |
| 2019/0229871 A1 | 7/2019 | Shi et al. |
| 2019/0319745 A1* | 10/2019 | Pan ........................ H04L 5/005 |
| 2019/0372711 A1 | 12/2019 | Luo et al. |
| 2020/0059245 A1 | 2/2020 | Zhang et al. |
| 2020/0100214 A1* | 3/2020 | Wei ........................ H04L 1/0045 |
| 2020/0187135 A1* | 6/2020 | Liu ....................... H04W 56/00 |
| 2020/0328869 A1* | 10/2020 | Liu ..................... H04W 56/001 |
| 2021/0176739 A1 | 6/2021 | Hui et al. |

FOREIGN PATENT DOCUMENTS

| | | |
|---|---|---|
| CN | 104125037 A | 10/2014 |
| CN | 105453456 A | 3/2016 |
| KR | 20130035506 | 4/2013 |
| WO | WO2009040653 | 4/2009 |
| WO | 2018147645 A1 | 8/2018 |

OTHER PUBLICATIONS

Chinese Office Action for Application No. 201880049172.4, mailed Jun. 22, 2021, 8 pgs.
Notic of Grant for CN Patent Application No. 202210197617.1; Dec. 29, 2023.
Office Action for CN Application No. 202210197617.1; Aug. 7, 2023.
Motorola "P-BCH Design"; 3GPP TSG RA1 #49bis R1-072665; Jun. 25, 2007.
Nokia Siemens Networks et al. "Scrambling Sequence Generation"; 3GPP TSG RAN Working Group 1 #51bis R1-080318; Jan. 14, 2008.
Sierra Wireless "CFO and other results for PBCH correlation decoder for MTC coverage improvement"; 3GPP TSG RAN WG1 #74 R1-132907; Aug. 19, 2013.
Ericsson "Introduction of LC/De MTC"; 3GPP TSG RAN WG1 Meeting #84 R1-161112; Feb. 15, 2016,.
Ericsson "Instrucion of eLAA"; 3GPP TSG RAN Meeting #86 R1-168215; Aug. 22, 2016.

* cited by examiner

SCRAMBLING OF PHYSICAL BROADCAST CHANNEL (PBCH)

PRIORITY CLAIM

This application is a continuation of U.S. patent application Ser. No. 16/632,416, filed Jan. 20, 2020, entitled "Scrambling of Physical Broadcast Channel (PBCH)", which is a United States National Stage Filing under 35 U.S.C. 371 from International Application No. PCT/US2018/043831, filed Jul. 26, 2018, which claims the benefit of priority to U.S. Provisional Patent Application Ser. No. 62/537,611, filed Jul. 27, 2017, and entitled "Technologies for Scrambling Broadcast Channel," which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to techniques for scrambling a physical broadcast channel (PBCH).

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming, and are expected to enable even greater speed, connectivity, and usability. Next generation 5G networks are expected to increase throughput, coverage, and robustness and reduce latency and operational and capital expenditures. As current cellular network frequency is saturated, higher frequencies, such as millimeter wave (mm Wave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to address scrambling of the physical broadcast channel.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1A:
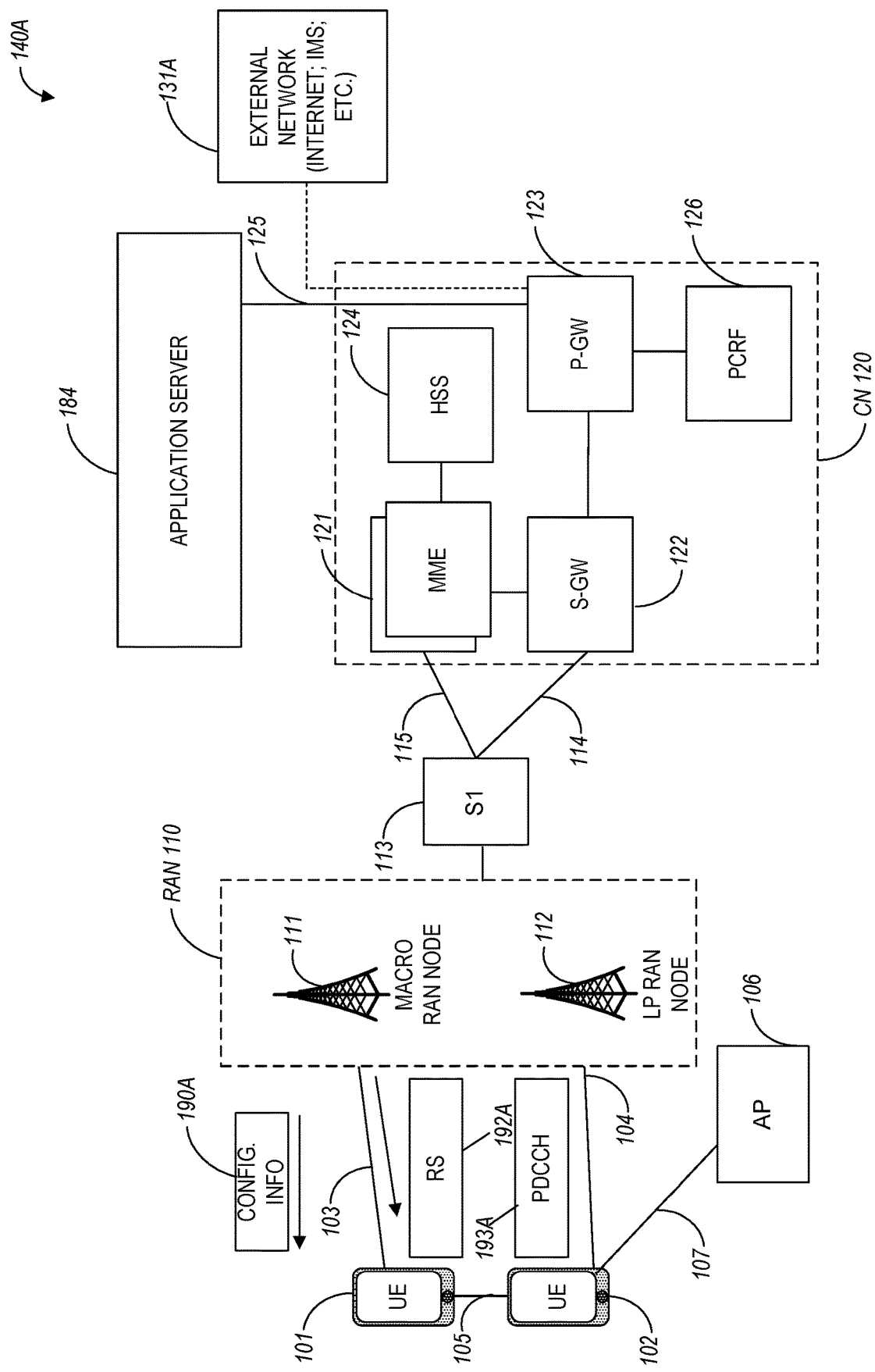
FIG. 1A illustrates an architecture of a network in accordance with some aspects.

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1A illustrates an architecture of a network in accordance with some aspects. The network 140A is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, FIG. 1E, FIG. 1F, and FIG. 1G.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMES 121.

In this aspect, the CN 120 comprises the MMES 121, the S-GW 122, the Packet Data Network (PDN) Gateway (P-GW) 123, and a home subscriber server (HSS) 124. The MMES 121 may be similar in function to the control plane of legacy Serving General Packet Radio Service (GPRS) Support Nodes (SGSN). The MMES 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate a SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macro-cells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can receive configuration information 190A via, e.g., higher layer signaling. The configuration information 190A can include a synchronization signal (SS) set, which can include a primary synchronization signal (PSS), a secondary synchronization signal (SSS), a physical broadcast channel (PBCH), and/or other types of configuration signaling. In some aspects, the UE 101 can also receive a reference signal 192A. In some aspects, the reference signal can be channel state information reference signal (CSI-RS), which can be used by the UE to estimate a channel and generate channel quality information (CQI) for reporting back to the gNB. In some aspects, the reference signal 192A can be a demodulation reference signal (DM-RS), which can be used for demodulation and decoding of data such as data received via a physical downlink shared channel (PDSCH). Additionally, the UE 101 can be configured to receive control information such as information received on the physical downlink control channel (PDCCH) 193A. In some aspects, the control information can include control resource sets (CORESETs) communicated via the PDCCH 193A.

In some aspects, the PBCH is transmitted with a periodicity configured by the network. The UE receiving the PBCH may not be able to decode the PBCH based on single reception of PBCH. In such case, the UE may need to soft combine multiple PBCHs from different reception instances. However, soft combining of PBCH can be possible among PBCH instances that contain the same payload content or at least among PBCH instances in which the UE can determine the bit difference among the payload content (i.e., PBCH payload content that could be transformed into another PBCH payload content by a linear operation, such as bit scrambling). The PBCH transmission among cells could be synchronized in synchronous networks, where transmission of PBCH from one cell interferes with transmission of PBCH from another cell. Since only the time information changes within the PBCH transmission time interval (TTI) and all cells are synchronous, the bit changes of one PBCH would be identical to the PBCH from another cell. This results in relative interference being identical between PBCH transmission instances. Because the interference does effectively change between PBCH transmissions, the gain from soft combining is lost as interference is not randomized between transmissions. Techniques disclosed herein can be used to randomize the PBCH transmission (e.g., within the configuration information 190A) among cells so that interference in synchronous networks can be randomized.

Figure 1B:
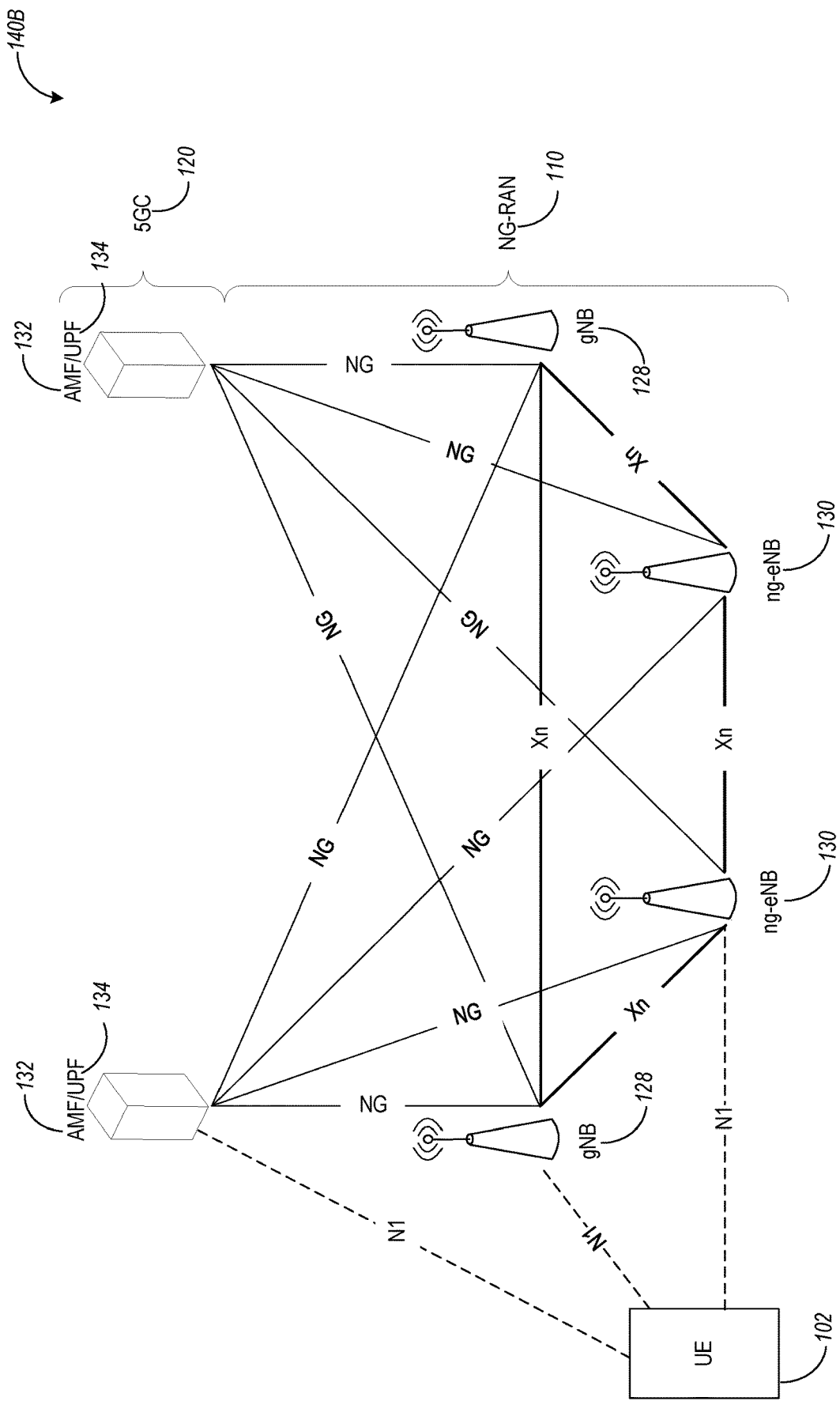
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via, e.g., an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE, and is connected via the NG interface to the 5GC 120. In some aspects, an NG-eNB 130 can include a node providing evolved universal terrestrial radio access (E-UTRA) user plane and control plane protocol terminations towards the UE, and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
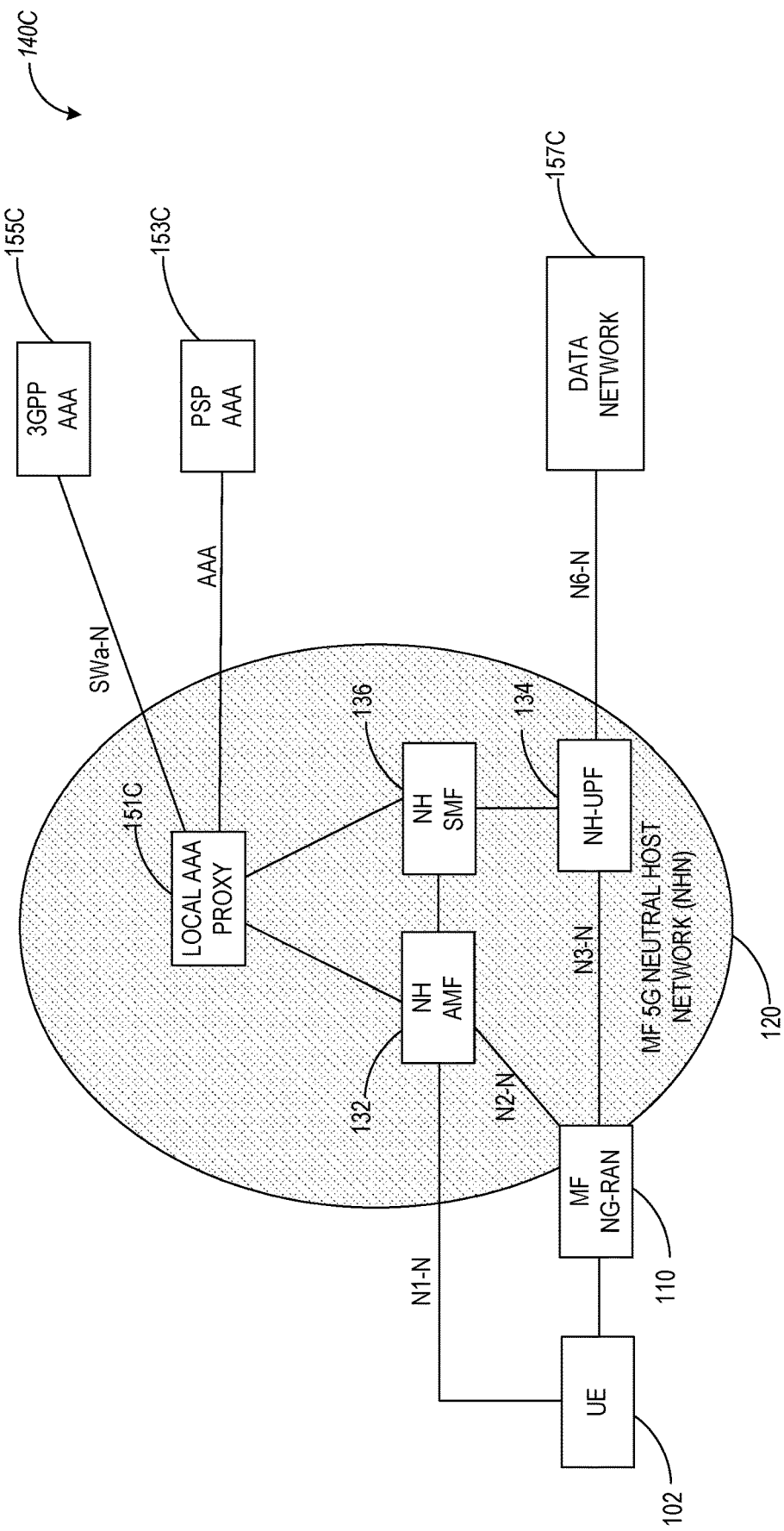
FIG. 1C illustrates an example MulteFire Neutral Host Network (NHN) 5G architecture in accordance with some aspects.

FIG. 1C illustrates an example MulteFire Neutral Host Network (NHN) 5G architecture 140C in accordance with some aspects. Referring to FIG. 1C, the MulteFire 5G architecture 140C can include the UE 102, NG-RAN 110, and core network 120. The NG-RAN 110 can be a MulteFire NG-RAN (MF NG-RAN), and the core network 120 can be a MulteFire 5G neutral host network (NHN).

In some aspects, the MF NHN 120 can include a neutral host AMF (NH AMF) 132, a NH SMF 136, a NH UPF 134, and a local AAA proxy 151C. The AAA proxy 151C can provide connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as a AMF in a 3GPP 5G core network (e.g., as described in reference to FIG. 1D). The NH-SMF 136 can be configured to provide similar functionality as a SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
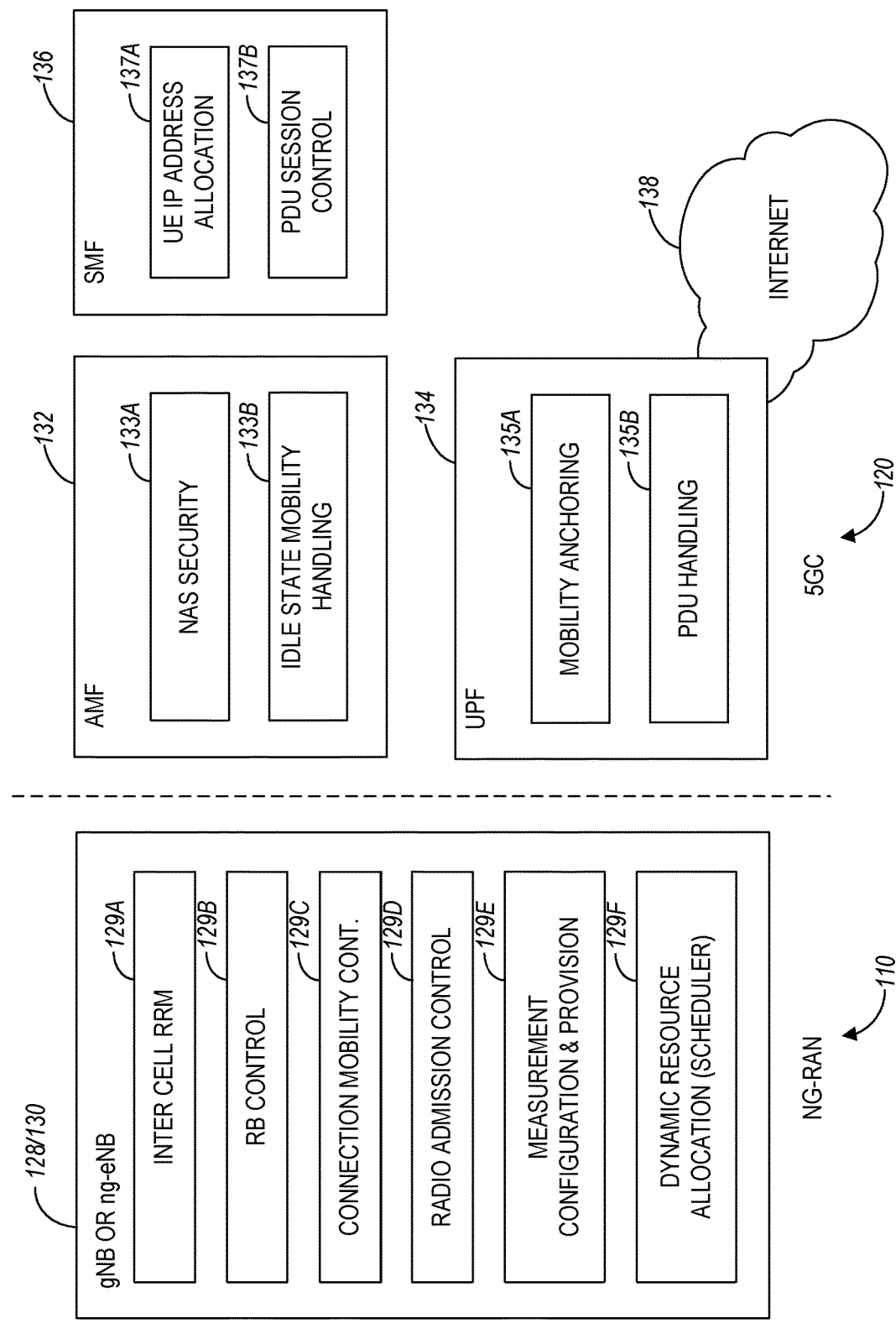
FIG. 1D illustrates a functional split between next generation radio access network (NG-RAN) and the 5G Core network (5GC) in accordance with some aspects.

FIG. 1D illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1E:
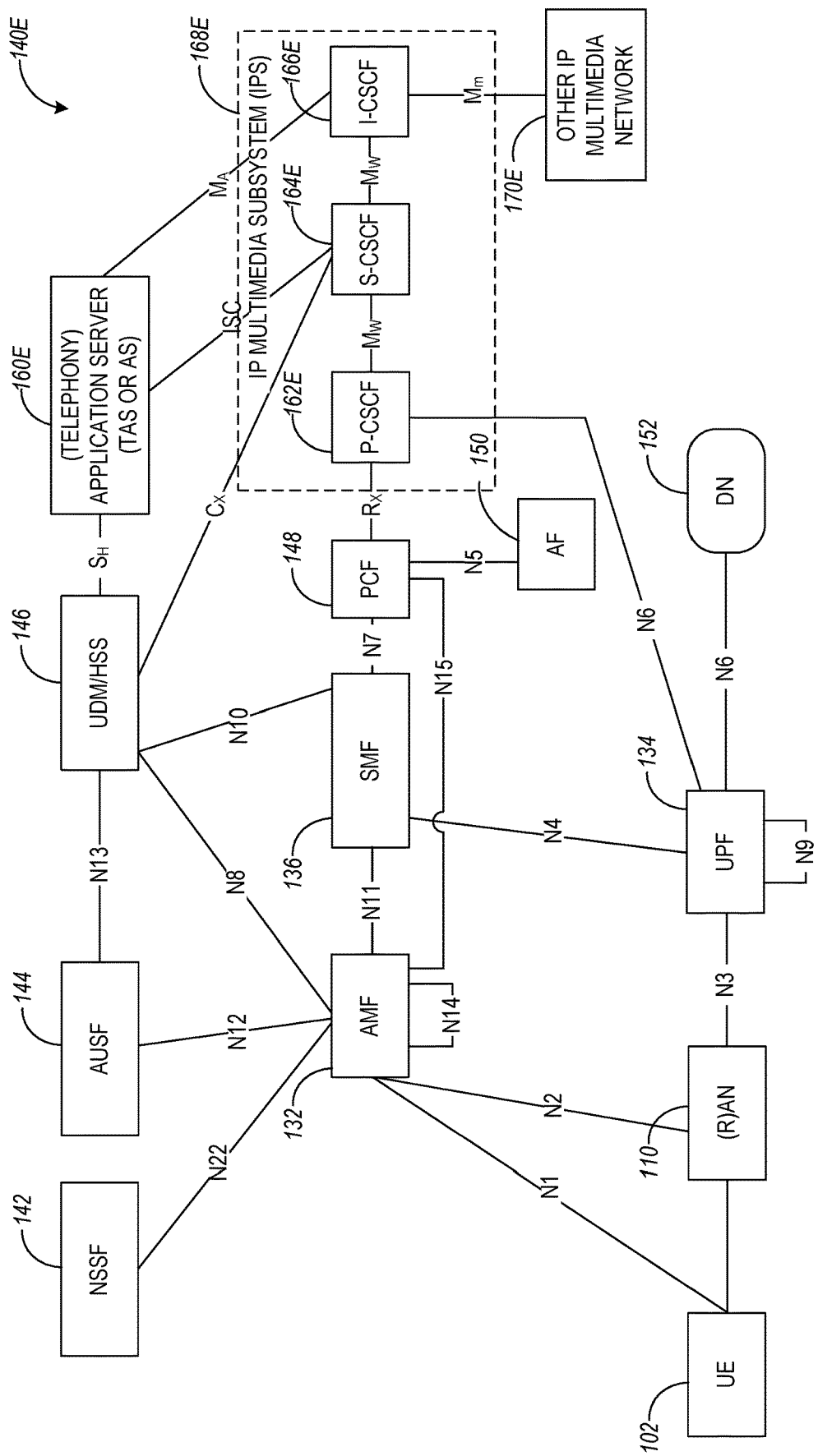
FIG. 1E and FIG. 1F illustrate a non-roaming 5G system architecture in accordance with some aspects.
Figure 1F:
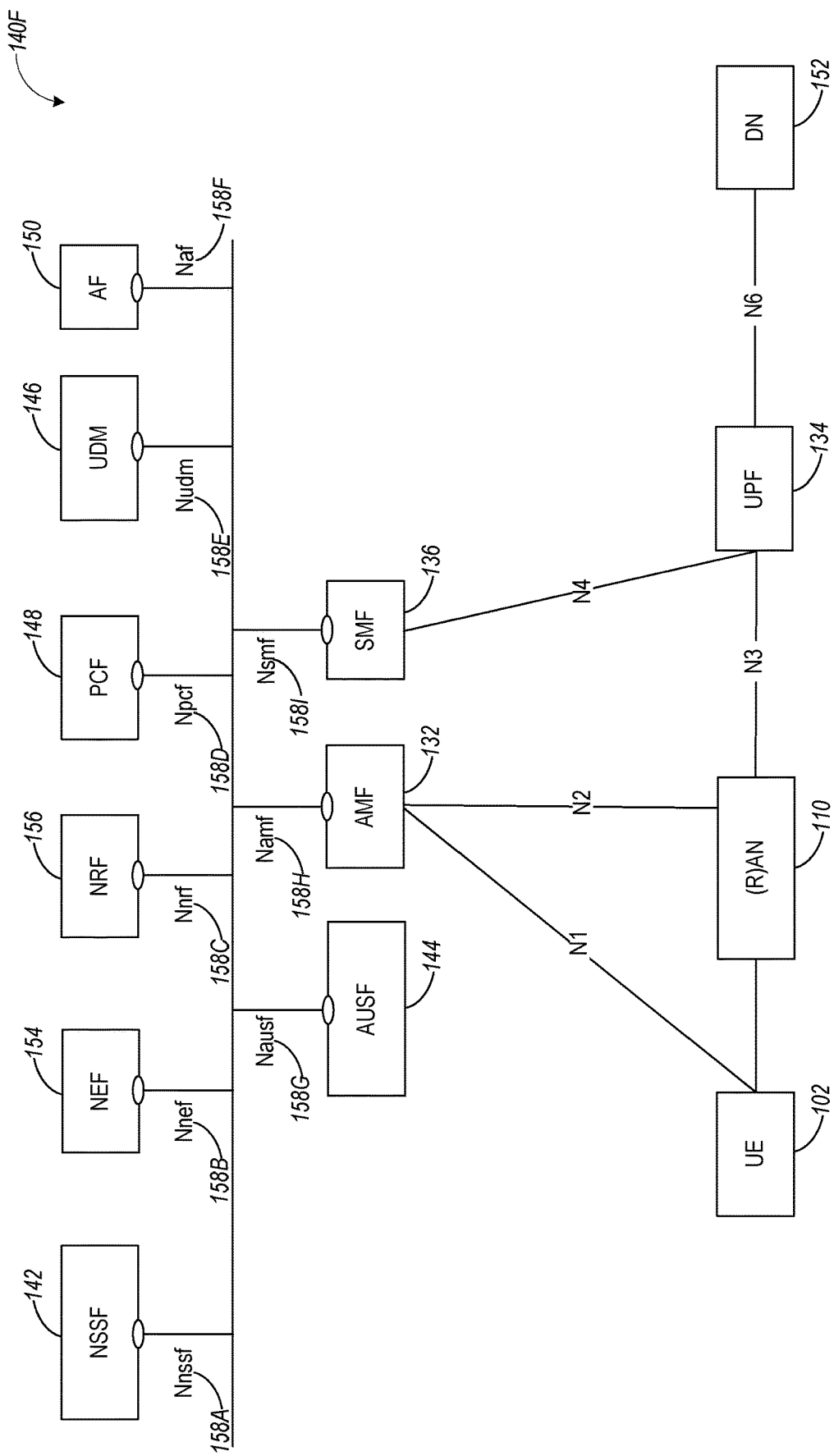

FIG. 1E and FIG. 1F illustrate a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF can be used to manage access control and mobility, and can also include network slice selection functionality. The SMF can be configured to set up and manage various sessions according to a network policy. The UPF can be deployed in one or more configurations according to a desired service type. The PCF can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), and/or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E and/or the I-CSCF 166E.

In some aspects, the 5G system architecture 140E can use a unified access barring mechanism using one or more of the techniques described herein, which access barring mechanism can be applicable for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator specific ways.

Referring to FIG. 1F, there is illustrated a 5G system architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1E) or as service-based interfaces (as illustrated in FIG. 1F).

A reference point representation shows that an interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1E), and N22 (between AMF 132 and NSSF 142). Other reference point representations not shown in FIG. 1E can also be used.

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
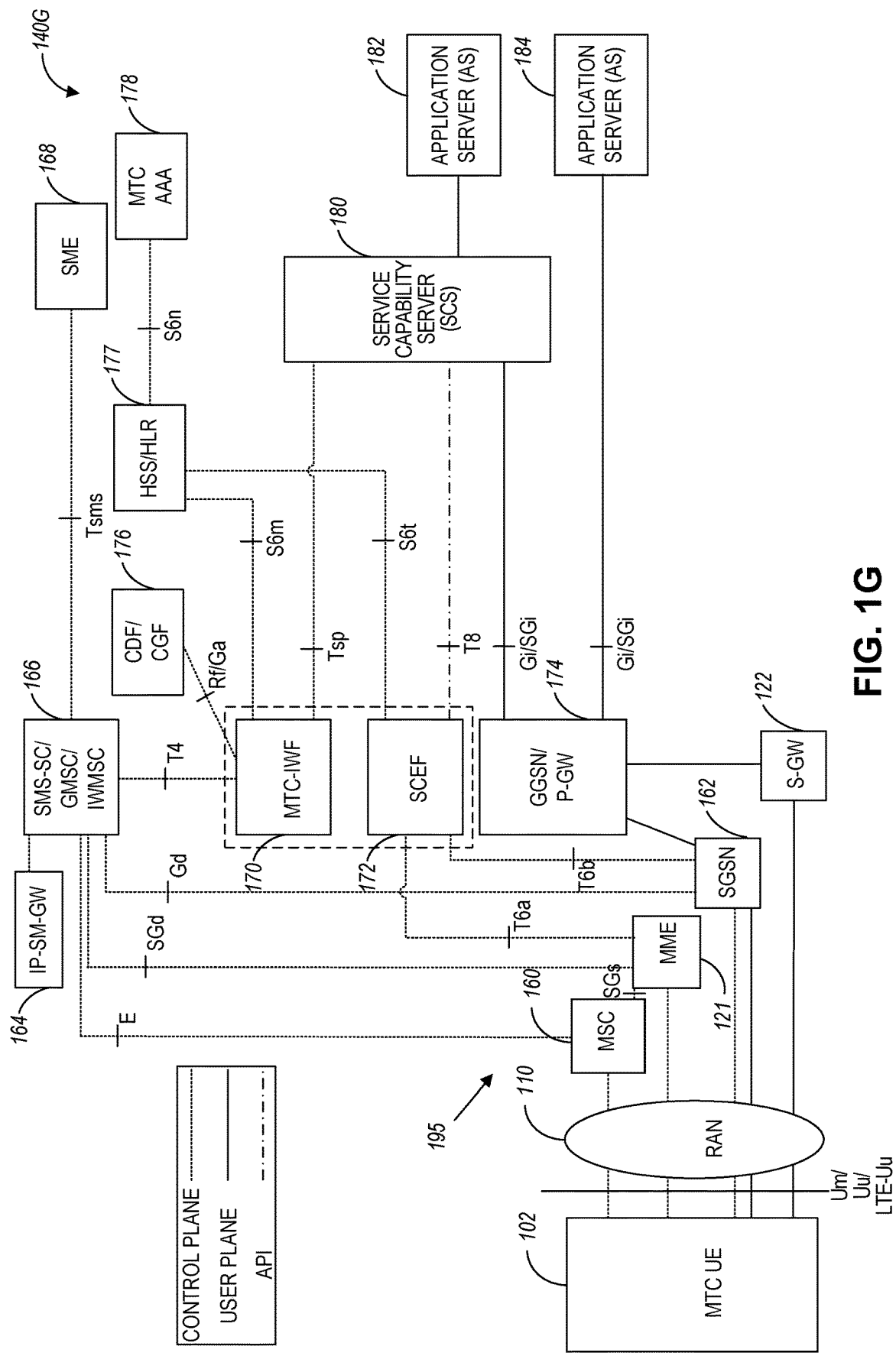
FIG. 1G illustrates an example Cellular Internet-of-Things (CIoT) network architecture in accordance with some aspects.

FIG. 1G illustrates an example CIoT network architecture in accordance with some aspects. Referring to FIG. 1G, the CIoT architecture 140G can include the UE 102 and the RAN 110 coupled to a plurality of core network entities. In some aspects, the UE 102 can be machine-type communication (MTC) UE. The CIoT network architecture 140G can further include a mobile services switching center (MSC) 160, MME 121, a serving GPRS support note (SGSN) 162, a S-GW 122, an IP-Short-Message-Gateway (IP-SM-GW) 164, a Short Message Service Service Center (SMS-SC)/gateway mobile service center (GMSC)/Interworking MSC (IWMSC) 166, MTC interworking function (MTC-IWF) 170, a Service Capability Exposure Function (SCEF) 172, a gateway GPRS support node (GGSN)/Packet-GW (P-GW) 174, a charging data function (CDF)/charging gateway function (CGF) 176, a home subscriber server (HSS)/a home location register (HLR) 177, short message entities (SME) 168, MTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1G further illustrates various reference points between different servers, functions, or communication nodes of the CIoT network architecture 140G. Some example reference points related to MTC-IWF 170 and SCEF 172 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by MTC-IWF 170 to interrogate HSS/HLR 177), S6n (a reference point used by MTC-AAA server 178 to interrogate HSS/HLR 177), and S6t (a reference point used between SCEF 172 and HSS/HLR 177).

In some aspects, the CIoT UE 102 can be configured to communicate with one or more entities within the CIoT architecture 140G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture.

In some aspects, the NAS protocol can support a set of NAS messages for communication between the CIoT UE 102 and an Evolved Packet System (EPS) Mobile Management Entity (MME) 121 and SGSN 162.

In some aspects, the CIoT network architecture 140F can include a packet data network, an operator network, or a cloud service network, having, for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including, for example, an air interface based on an S6a reference point, and configured to authenticate/authorize CIoT UE 102 to access the CIoT network. The RAN 110 can be coupled to the CIoT network architecture 140G using one or more other reference points including, for example, an air interface corresponding to an SGi/Gi interface for 3GPP accesses. The RAN 110 can be coupled to the SCEF 172 using, for example, an air interface based on a T6a/T6b reference point, for service capability exposure. In some aspects, the SCEF 172 may act as an API GW towards a third-party application server such as AS 182. The SCEF 172 can be coupled to the HSS/HLR 177 and MTC AAA 178 servers using an S6t reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIoT UE 102 can include a smart phone, a tablet computer, or one or more other electronic device acting as a CIoT device for a specific function, while having other additional functionality.

In some aspects, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. In some aspects, circuitry as well as modules disclosed herein may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 1H:
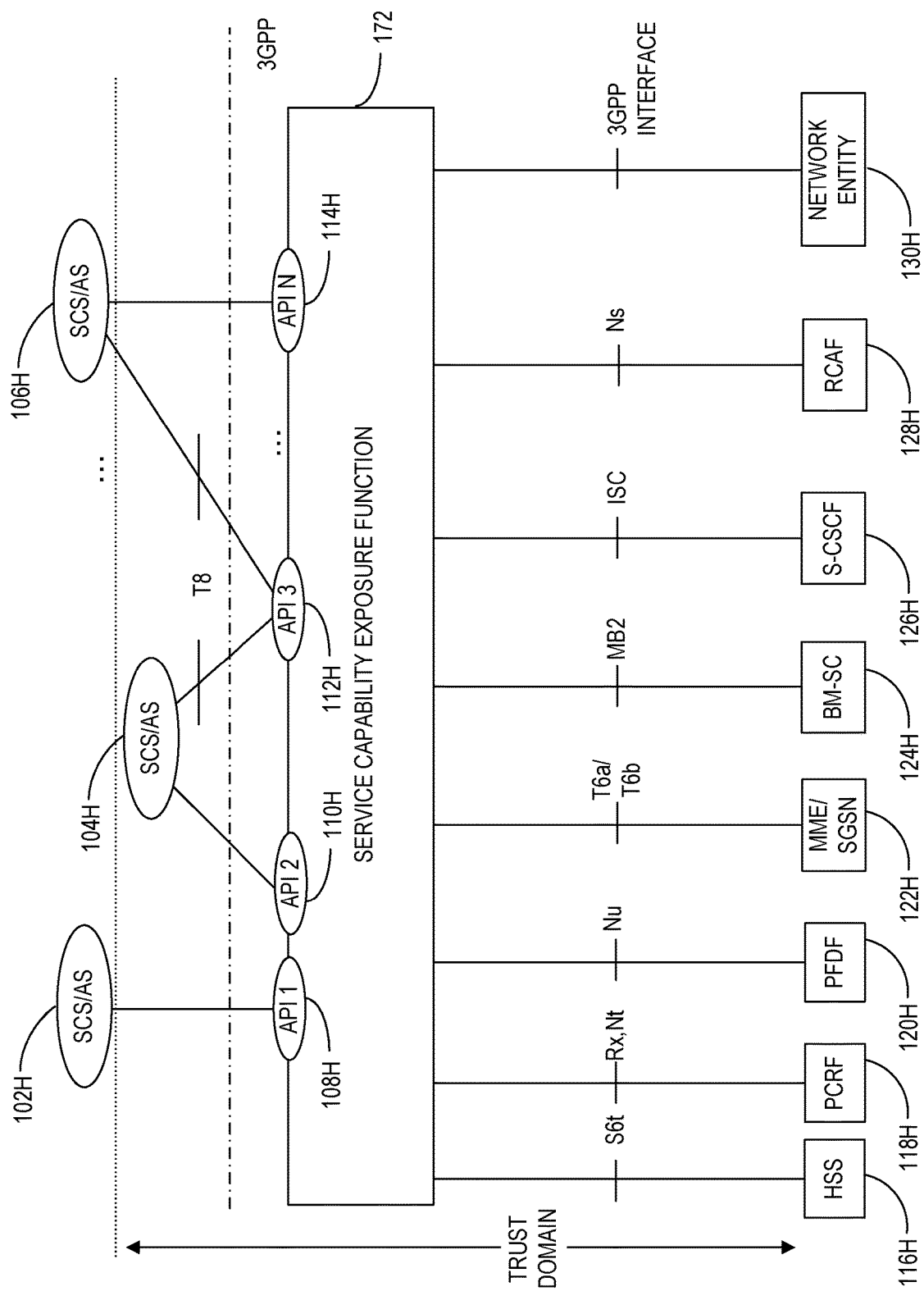
FIG. 1H illustrates an example Service Capability Exposure Function (SCEF) in accordance with some aspects.

FIG. 1H illustrates an example Service Capability Exposure Function (SCEF) in accordance with some aspects. Referring to FIG. 1H, the SCEF 172 can be configured to expose services and capabilities provided by 3GPP network interfaces to external third party service provider servers hosting various applications. In some aspects, a 3GPP network such as the CIoT architecture 140G, can expose the following services and capabilities: a home subscriber server (HSS) 116H, a policy and charging rules function (PCRF) 118H, a packet flow description function (PFDF) 120H, a MME/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H.

The SCEF 172 can be configured to expose the 3GPP network services and capabilities to one or more applications running on one or more service capability server (SCS)/application server (AS), such as SCS/AS 102H, 104H, . . . , 106H. Each of the SCS/AG 102H-106H can communicate with the SCEF 172 via application programming interfaces (APIs) 108H, 110H, 112H, . . . , 114H, as seen in FIG. 1H.

Figure 1I:
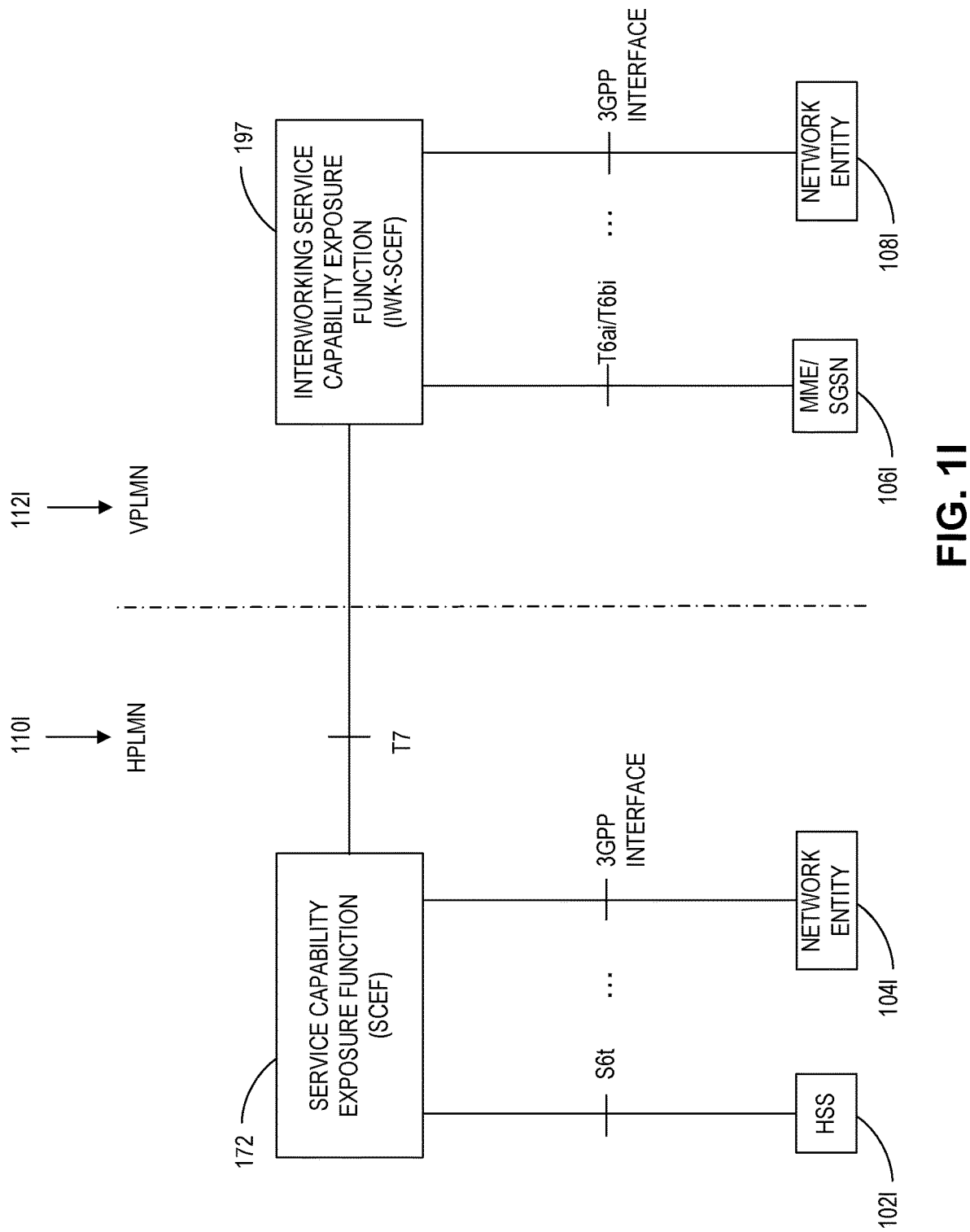
FIG. 1I illustrates an example roaming architecture for SCEF in accordance with some aspects.

FIG. 1I illustrates an example roaming architecture for SCEF in accordance with some aspects. Referring to FIG. 1I, the SCEF 172 can be located in HPLMN 110I and can be configured to expose 3GPP network services and capabilities, such as 102I, . . . , 104I. In some aspects, 3GPP network services and capabilities, such as 106I, . . . , 108I, can be located within VPLMN 112I. In this case, the 3GPP network services and capabilities within the VPLMN 112I can be exposed to the SCEF 172 via an interworking SCEF (IWK-SCEF) 197 within the VPLMN 112I.

Figure 2:
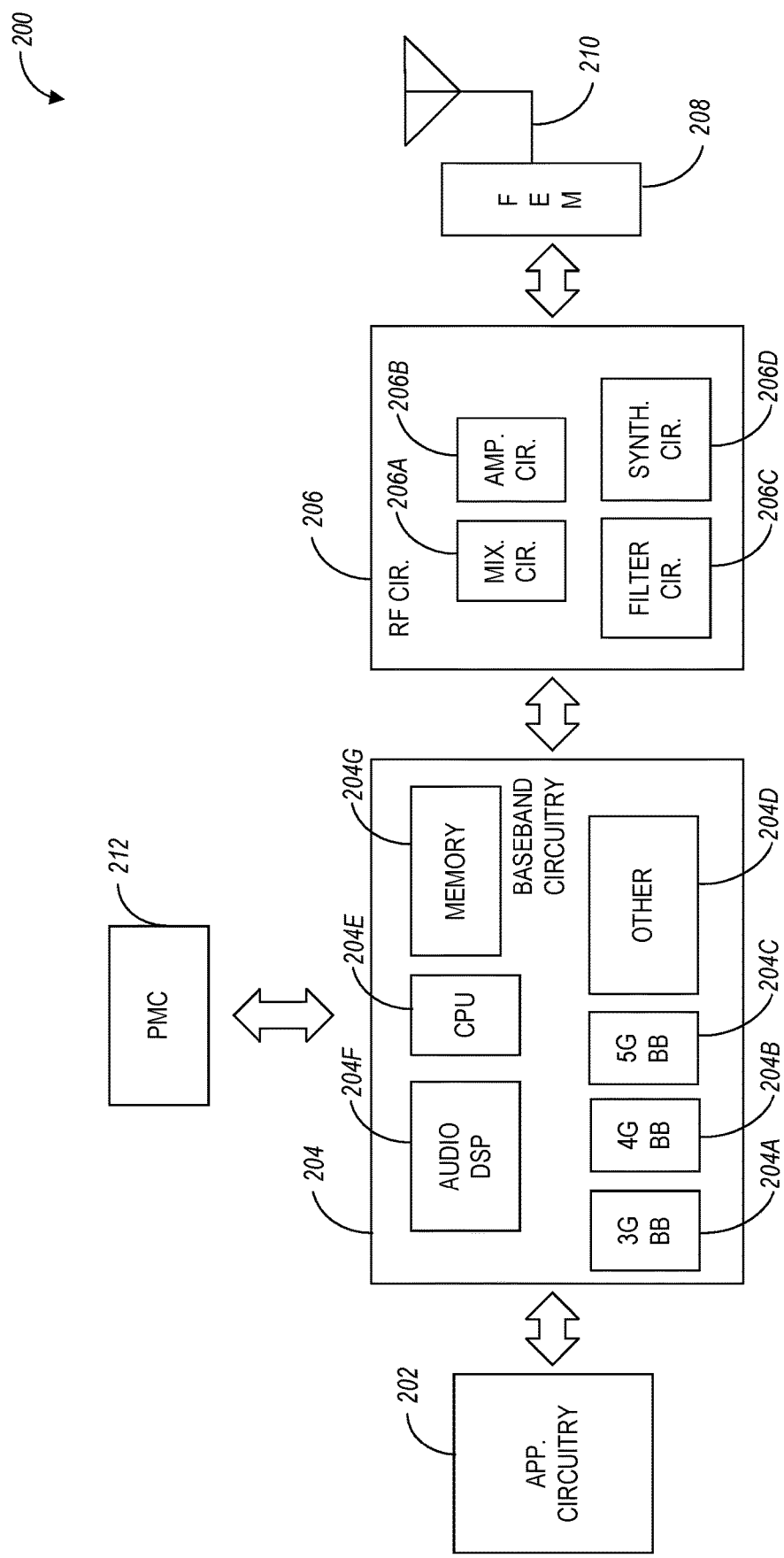
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some aspects, modulation/demodulation circuitry of the baseband circuitry 204 may include Fast-Fourier Transform (FFT), precoding, or constellation mapping/de-mapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry 204 may be suitably combined in a single chip, a single chipset, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature down conversion and up conversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct down conversion and direct up conversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. Divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling, battery charging, and/or DC-to-DC conversion. The PMC 212 may, in some aspects, be included when the device 200 is capable of being powered by a battery, for example, when the device is included in a UE. The PMC 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
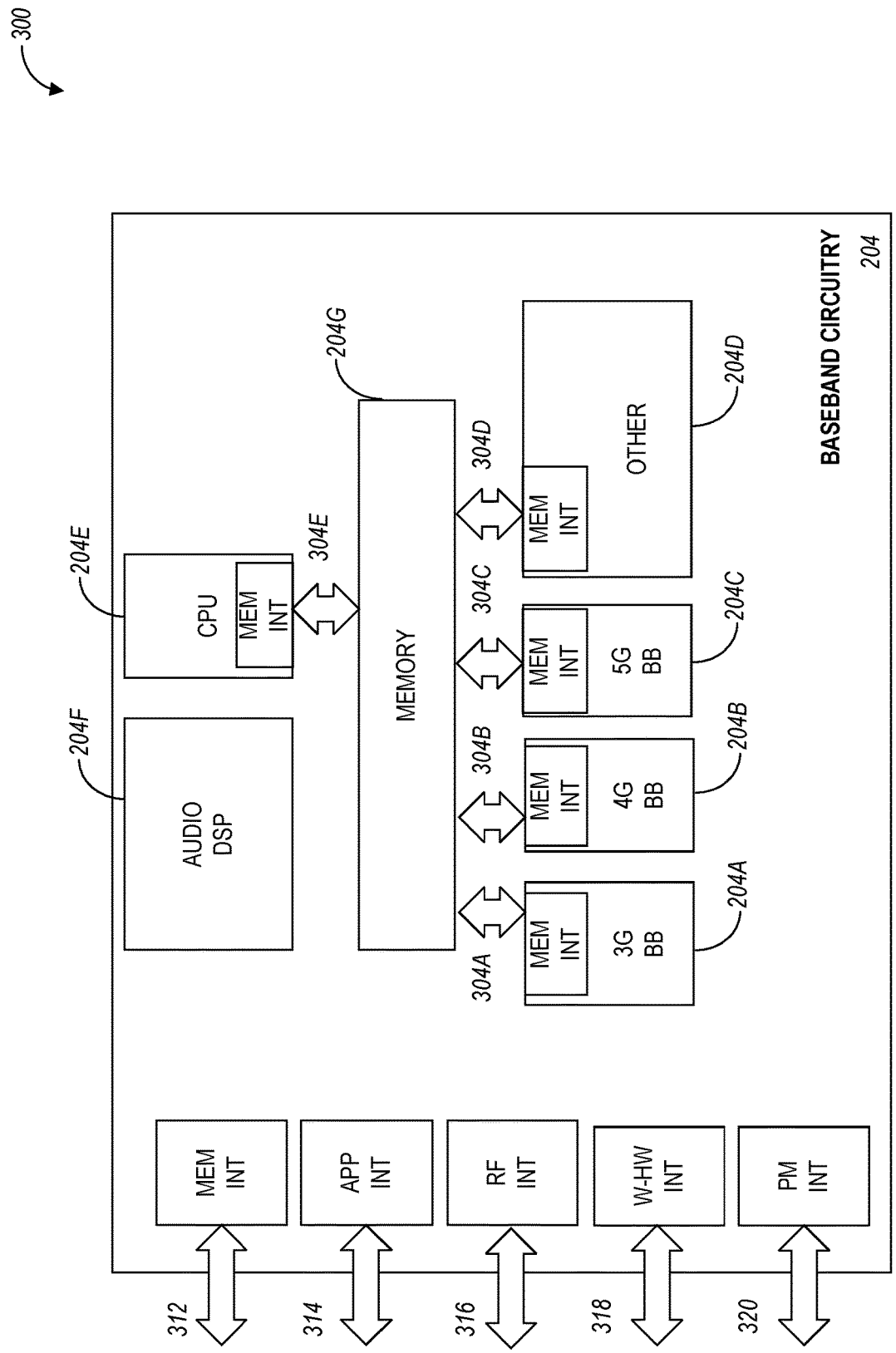
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
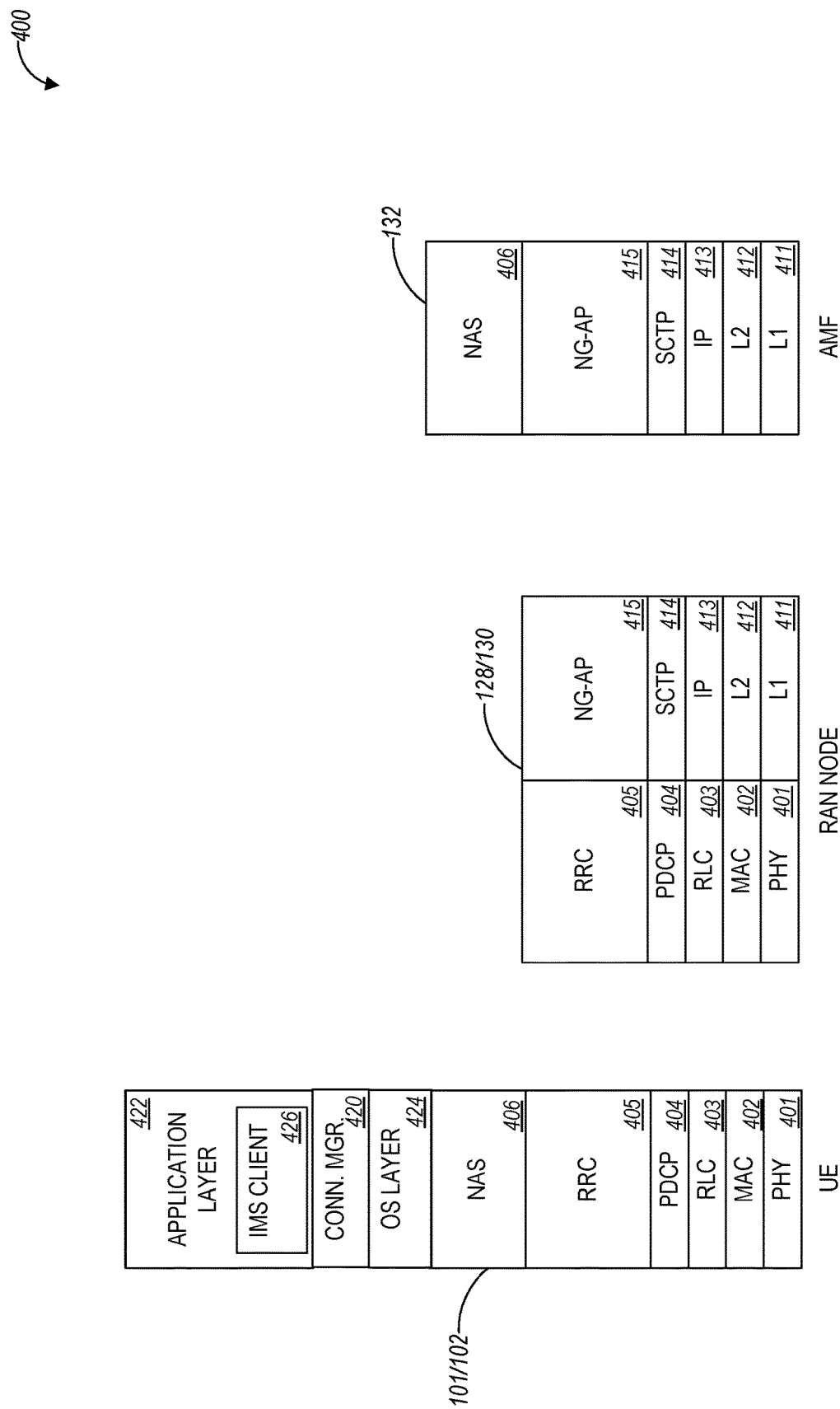
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 102, the RAN node 128 (or alternatively, the RAN node 130), and the AMF 132.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 403 may in some aspects operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and segmentation and reassembly of RLC SDUs for UM and AM data transfers. The RLC layer 403 may also maintain sequence numbers independent of the ones in PDCP for UM and AM data transfers. The RLC layer 403 may also in some aspects execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split bearers, execute retransmission of lower layer SDUs, cipher and decipher control plane and user plane data, perform integrity protection and integrity verification of control plane and user plane data, control timer-based discard of data, and perform security operations (e.g., ciphering, deciphering, integrity protection, integrity verification, etc.).

In some aspects, primary services and functions of the RRC layer 405 may include broadcast of system information (e.g., included in Master Information Blocks (MIBs) or System Information Blocks (SIBs) related to the non-access stratum (NAS)); broadcast of system information related to the access stratum (AS); paging initiated by 5GC 120 or NG-RAN 110, establishment, maintenance, and release of an RRC connection between the UE and NG-RAN (e.g., RRC connection paging, RRC connection establishment, RRC connection addition, RRC connection modification, and RRC connection release, also for carrier aggregation and Dual Connectivity in NR or between E-UTRA and NR); establishment, configuration, maintenance, and release of Signalling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting. Said MIBs and SIBs may comprise one or more information elements (IEs), which may each comprise individual data fields or data structures. The RRC layer 405 may also, in some aspects, execute QoS management functions, detection of and recovery from radio link failure, and NAS message transfer between the NAS 406 in the UE and the NAS 406 in the AMF 132.

In some aspects, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
| --- | --- | --- | --- |
| Registration Request | Initial registration procedure | Attach Request | Attach procedure |
| Registration Request | Mobility registration update procedure | Tracking Area Update (TAU) Request | Tracking area updating procedure |
| Registration Request | Periodic registration update procedure | TAU Request | Periodic tracking area updating procedure |
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some aspects, when the same message is used for more than one procedure, then a parameter can be used (e.g., registration type or TAU type) which indicates the specific purpose of the procedure, e.g. registration type="initial registration", "mobility registration update" or "periodic registration update".

The UE 101 and the RAN node 128/130 may utilize an NG radio interface (e.g., an LTE-Uu interface or an NR radio interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the AMF 132 as illustrated in FIG. 4. In aspects, the NAS protocols 406 support the mobility of the UE 101 and the session management procedures to establish and maintain IP connectivity between the UE 101 and the UPF 134. In some aspects, the UE protocol stack can include one or more upper layers, above the NAS layer 406. For example, the upper layers can include an operating system layer 424, a connection manager 420, and application layer 422. In some aspects, the application layer 422 can include one or more clients which can be used to perform various application functionalities, including providing an interface for and communicating with one or more outside networks. In some aspects, the application layer 422 can include an IP multimedia subsystem (IMS) client 426.

The NG Application Protocol (NG-AP) layer 415 may support the functions of the N2 and N3 interface and comprise Elementary Procedures (EPs). An EP is a unit of interaction between the RAN node 128/130 and the 5GC 120. In certain aspects, the NG-AP layer 415 services may comprise two groups: UE-associated services and non UE-associated services. These services perform functions including, but not limited to: UE context management, PDU session management and management of corresponding NG-RAN resources (e.g. Data Radio Bearers [DRBs]), UE capability indication, mobility, NAS signaling transport, and configuration transfer (e.g. for the transfer of SON information).

The Stream Control Transmission Protocol (SCTP) layer (which may alternatively be referred to as the SCTP/IP layer) 414 may ensure reliable delivery of signaling messages between the RAN node 128/130 and the AMF 132 based, in part, on the IP protocol, supported by the IP layer 413. The L2 layer 412 and the L1 layer 411 may refer to communication links (e.g., wired or wireless) used by the RAN node 128/130 and the AMF 132 to exchange information.

The RAN node 128/130 and the AMF 132 may utilize an N2 interface to exchange control plane data via a protocol stack comprising the L1 layer 411, the L2 layer 412, the IP layer 413, the SCTP layer 414, and the S1-AP layer 415.

Figure 5:
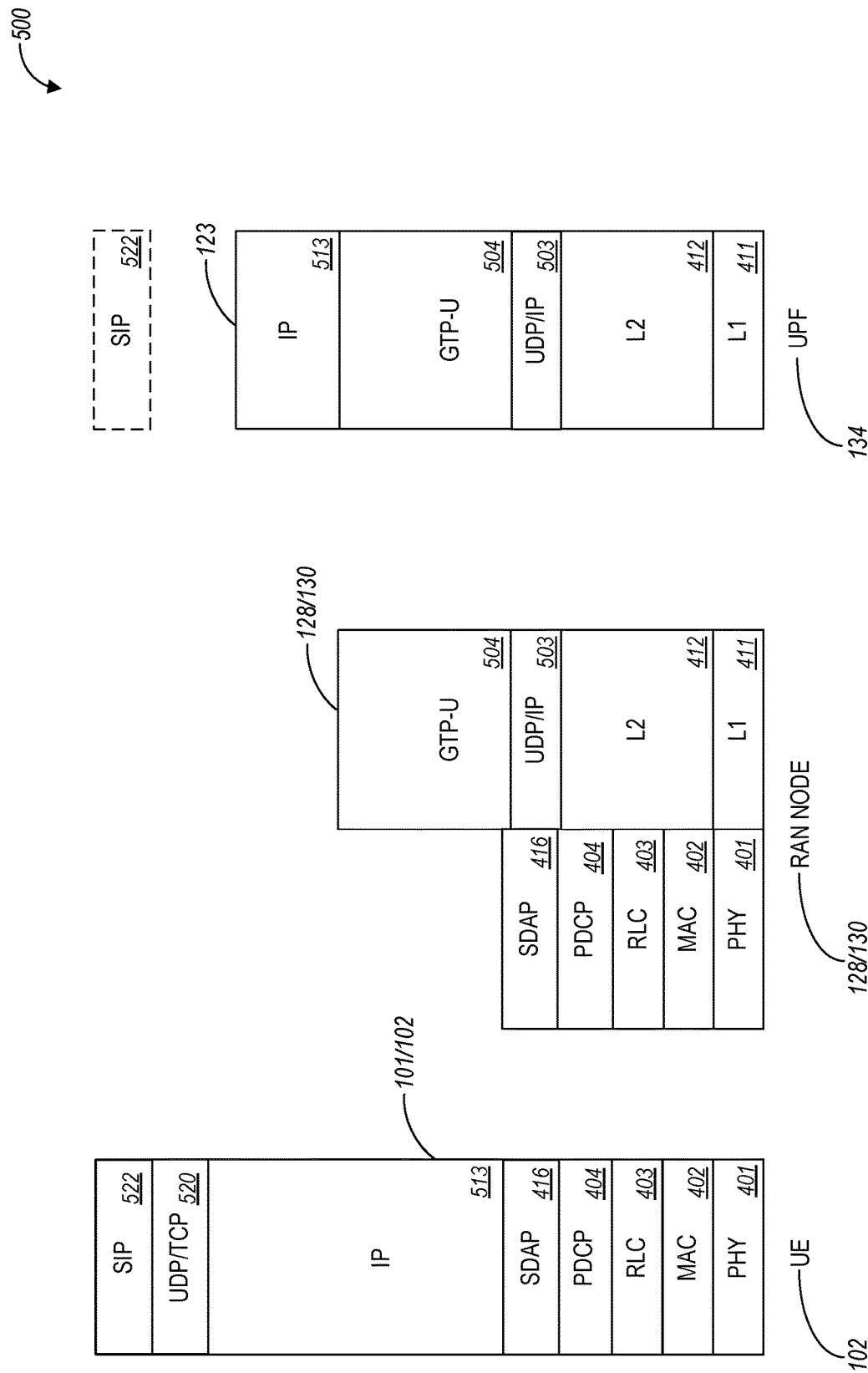
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 102, the RAN node 128 (or alternatively, the RAN node 130), and the UPF 134. The user plane 500 may utilize at least some of the same protocol layers as the control plane 400. For example, the UE 102 and the RAN node 128 may utilize an NR radio interface to exchange user plane data via a protocol stack comprising the PHY layer 401, the MAC layer 402, the RLC layer 403, the PDCP layer 404, and the Service Data Adaptation Protocol (SDAP) layer 416. The SDAP layer 416 may, in some aspects, execute a mapping between a Quality of Service (QoS) flow and a data radio bearer (DRB) and a marking of both DL and UL packets with a QoS flow ID (QFI). In some aspects, an IP protocol stack 513 can be located above the SDAP 416. A user datagram protocol (UDP)/transmission control protocol (TCP) stack 520 can be located above the IP stack 513. A session initiation protocol (SIP) stack 522 can be located above the UDP/TCP stack 520, and can be used by the UE 102 and the UPF 134.

The General Packet Radio Service (GPRS) Tunneling Protocol for the user plane (GTP-U) layer 504 may be used for carrying user data within the 5G core network 120 and between the radio access network 110 and the 5G core network 120. The user data transported can be packets in IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 128/130 and the UPF 134 may utilize an N3 interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the UPF 134.

Figure 6:
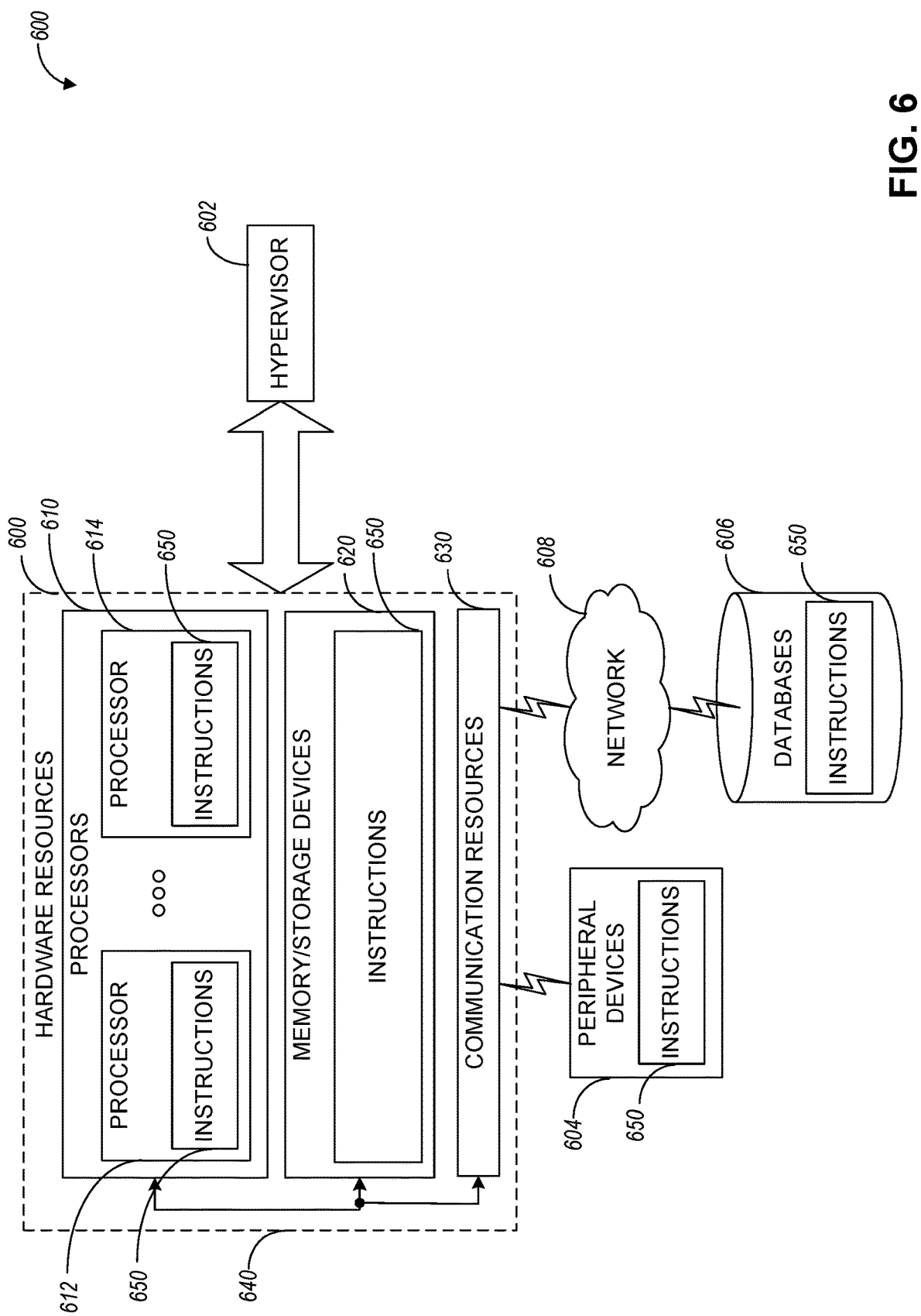
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
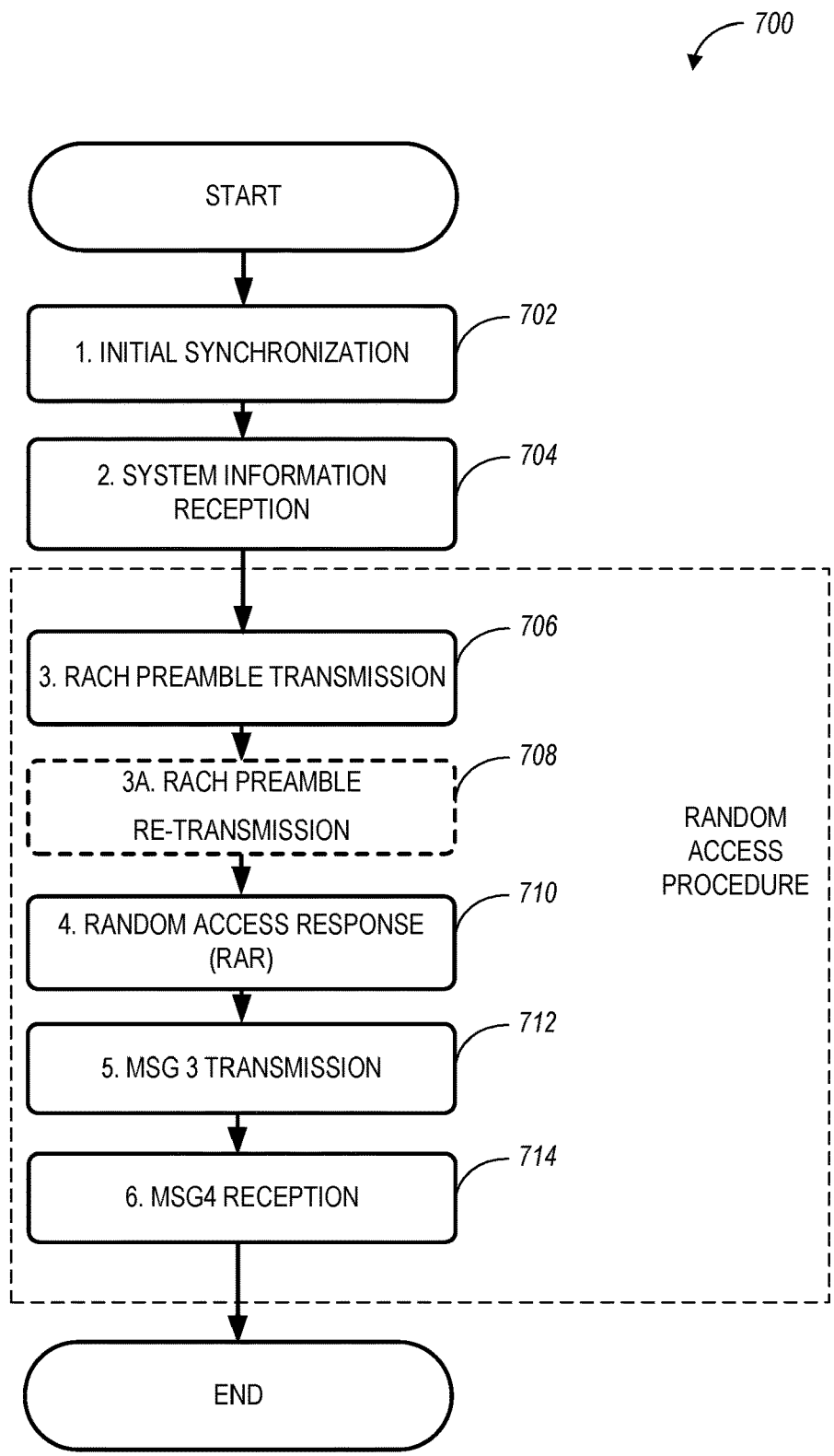
FIG. 7 is an illustration of an initial access procedure including PRACH preamble retransmission in accordance with some aspects.

FIG. 7 is an illustration of an initial access procedure 700 including PRACH preamble retransmission in accordance with some aspects. Referring to FIG. 7, the initial access procedure 700 can start with operation 702, when initial synchronization can take place. For example, the UE 101 can receive a primary synchronization signal and a secondary synchronization signal to achieve the initial synchronization. In some aspects, the initial synchronization at operation 702 can be performed using one or more SS blocks received within an SS burst set. At operation 704, the UE 101 can receive system information, such as one or more system information blocks (SIBs) and/or master information blocks (MIBs).

At operation 706 through 714, a random access procedure can take place. More specifically, at operation 706, a PRACH preamble transmission can take place as message 1 (Msg1). At operation 710, UE 101 can receive a random access response (RAR) message, which can be random access procedure message 2 (Msg2). In Msg2, the node (e.g., gNB) 111 can respond with random access radio network temporary identifier (RA-RNTI), which can be calculated from the preamble resource (e.g., time and frequency allocation).

In some aspects, UE 101 can be configured to perform one or more retransmissions of the PRACH preamble at operation 708, when the RAR is not received or detected within a preconfigured or predefined time window. The PRACH preamble retransmission can take place with power ramping, as explained herein below, so that the transmission power is increased until the random-access response is received.

At operation 712, UE 101 can transmit a random access procedure message 3 (Msg3), which can include a radio resource control (RRC) connection request message. At operation 714, a random access procedure message 4 (Msg4) can be received by the UE 101, which can include an RRC connection setup message, carrying the cell radio network temporary identifier (CRNTI) used for subsequent communication between the UE 101 and the node 111.

In some aspects, the UE 101 can be configured to perform uplink (UL) beam switching during retransmissions of configuration data such as the PRACH preamble. In some aspects, in cases when the UE has multiple analog beams and beam correspondence between transmission and reception is not available, then the UE may need to either change the transmission beam for the retransmission of PRACH or increase the transmission power of the PRACH retransmission. In aspects when the UE changes the Tx beam, then its power ramping counter can remain unchanged (i.e., the UE uses the same or similar power for the PRACH transmission in comparison with the previous PRACH transmission). In aspects when the UE does not change the Tx beam, then its power ramping counter can increase (e.g., incremented by one), and the UE can be configured to increase power for the PRACH retransmission.

In aspects when the UE is configured for multi-beam operation, synchronization signals (SSs) from multiple antennas in base station can be received, where the base station can be configured to generate the SSs using beam sweeping. In aspects when the UE detects a synchronization signal from a certain beam, then there can be one PRACH resource associated with the beam of the detected synchronization signal. In this regard, the UE can be configured to use the PRACH resource for the transmission of the PRACH preamble. Depending on the beam of the detected synchronization signal, the UE may use different PRACH resources for different PRACH sequences.

Figure 8A:
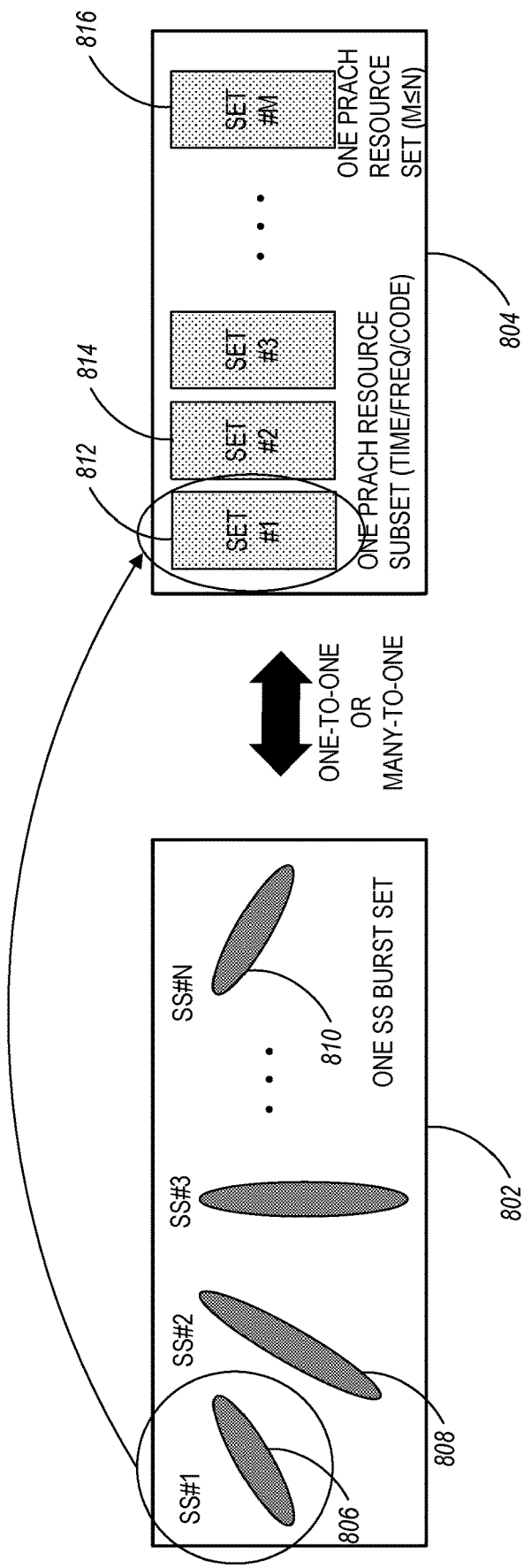
FIG. 8A is an illustration of PRACH resource configuration in accordance with some aspects.

FIG. 8A is an illustration of PRACH resource configuration in accordance with some aspects. In some aspects, the base station (e.g. gNB or node 111) can communicate a synchronization signal burst set 802, which can include multiple synchronization signals (or SS blocks) such as 806, 808, . . . , 810. The base station can use multiple synchronization signal blocks (SS blocks) for each downlink transmission beam. In some aspects, for each downlink transmission beam, there can be one PRACH resource subset configured by system information. For example, the UE 101 can be configured with a PRACH resource set 804, which can include PRACH resource subsets 812, 814, . . . , 816. Each of the PRACH resource subsets can include time and frequency information for communicating PRACH-related information such as the PRACH preamble. In some aspects, one-to-one or many-to-one correlation can exist between the synchronization signal blocks 806, . . . , 810 and the PRACH resource subsets 812, . . . , 816.

In some aspects, the control information carried by a PDCCH can include one or more control resource sets (CORESETs). PDCCH CORESETs denote time-frequency resources that are configured to a UE for monitoring for potential transmission of PDCCH carrying DL control information (DCI). In this regard, a CORESET can be defined as a set of resource element groups (REGs) with one or more symbol duration under a given numerology within which the UE 101 can attempt to (e.g., blindly) decode downlink control information (DCI). A UE is configured with PDCCH monitoring occasions and is expected to monitor for PDCCH in the CORESET associated with a particular PDCCH monitoring occasion configuration. In frequency domain, a CORESET can be contiguous or non-contiguous; while in time domain, a CORESET can be configured with one or a set of contiguous OFDM symbols. In addition, for large carrier bandwidth, maximum CORESET duration in time can be, e.g., 2 symbols while for narrow carrier bandwidth, maximum CORESET duration in time can be, e.g., 3 symbols. Additionally, either time-first or frequency-first REG-to-control channel element (CCE) mapping can be supported for NR PDCCH.

In some aspects, the physical antennas elements of a transmission-reception point (TRP), a gNB, and a UE can be grouped into antenna subarrays, where an antenna array may contain multiple subarrays. In some aspects, the physical antenna elements of the antenna sub-array can be virtualized to the antenna port(s) using analog beamforming. The analog beamforming may be used to improve the performance of the communication link between the TRP and the UE. The analog beamforming at the TRP and at the UE may be trained by transmitting a series of the reference signals with different beamforming. In some aspects, the UE may also train the receive beamforming. The optimal analog beamforming at the UE may be depend on the beamforming at the TRP and vice versa. In some aspects, each subarray may have different analog beamforming, which can be controlled by antenna weights.

In some aspects, multiple optimal Tx/Rx beam combinations at the TRP/gNB and the UE can be established for possible communication. An optimal Tx beam on one antenna subarray can be reused on another antenna subarray. The optimal Rx beam at the UE can be the same. The reference signals transmitted on antenna port with the same beam (using the same or different panels) are quasi co-located (or QCL-ed) with each other with regard to spatial channel parameters.

Figure 8B:
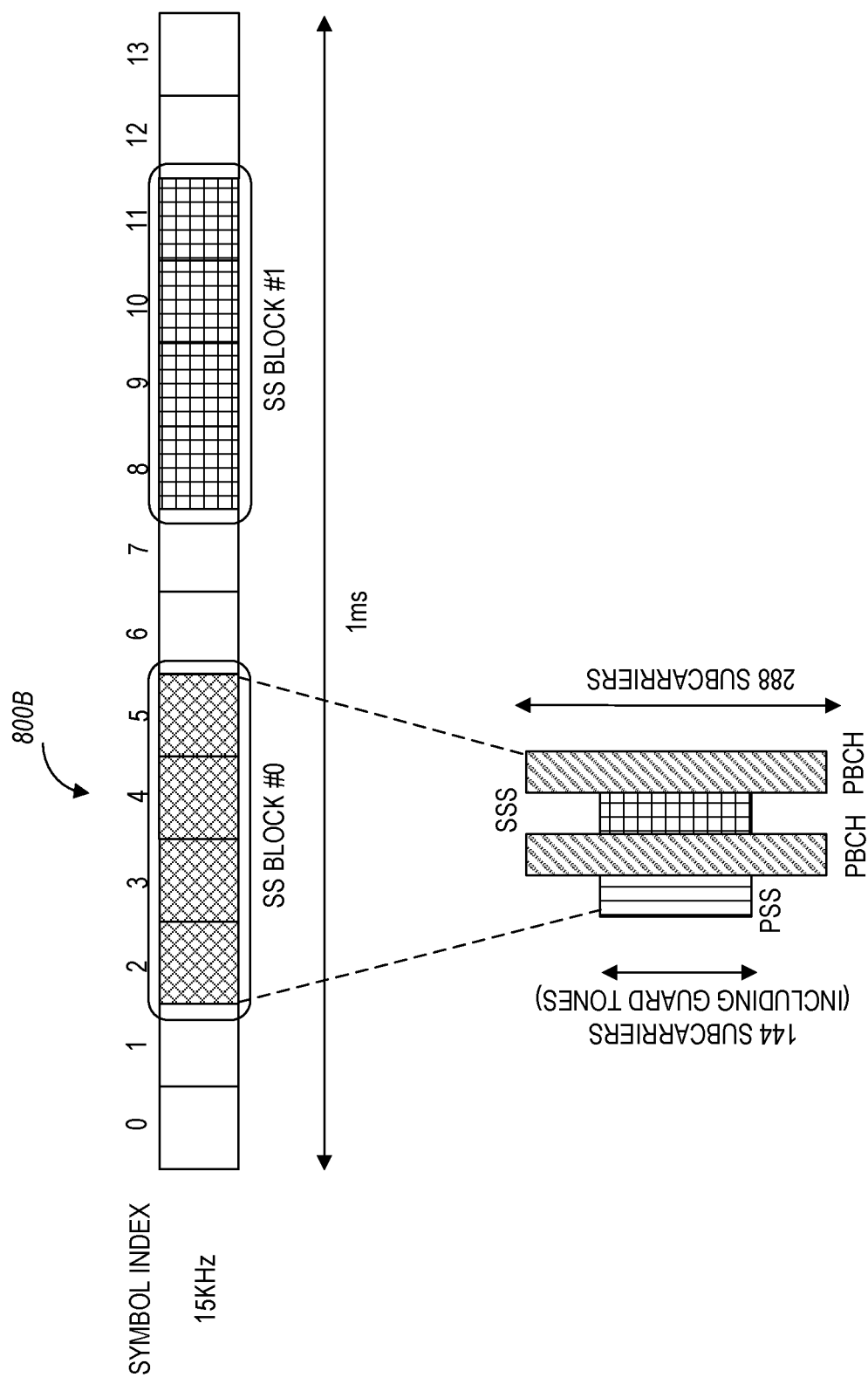
FIG. 8B illustrates SS block mapping and SS block pattern for 15 kHz subcarrier spacing in accordance with some aspects.

FIG. 8B illustrates SS block mapping and SS block pattern for 15 kHz subcarrier spacing in accordance with some aspects. Referring to FIG. 8B, the SS block 800B can include a primary synchronization signal (PSS), a secondary synchronization signal (SSS), and a physical broadcast channel (PBCH), as illustrated in FIG. 8B. In some aspects, depending on subcarrier spacing employed in the SS blocks and carrier frequency, various patterns can be defined for the transmission of SS blocks within a slot. For example, as seen in FIG. 8B, two SS blocks can be transmitted within a slot with 15 kHz subcarrier spacing, but other transmission patterns of SS blocks can be used as well. Additionally, FIG. 8B illustrates example SS block signal configuration in frequency domain.

In some aspects, the transmission of SS blocks within an SS burst set can be confined to a 5 millisecond (ms) window regardless of SS burst set periodicity. Within the 5 ms window, the number of possible candidate SS block locations can be designated as L, where the maximum number of SS-blocks within SS burst set, L, for different frequency ranges can be as follows: (a) for frequency range up to 3 GHz, L can be 4; (b) for frequency ranges from 3 GHz to 6 GHz, L can be 8; and (c) for frequency range from 6 GHz to 52.6 GHz, L can be 64.

Figure 8C:
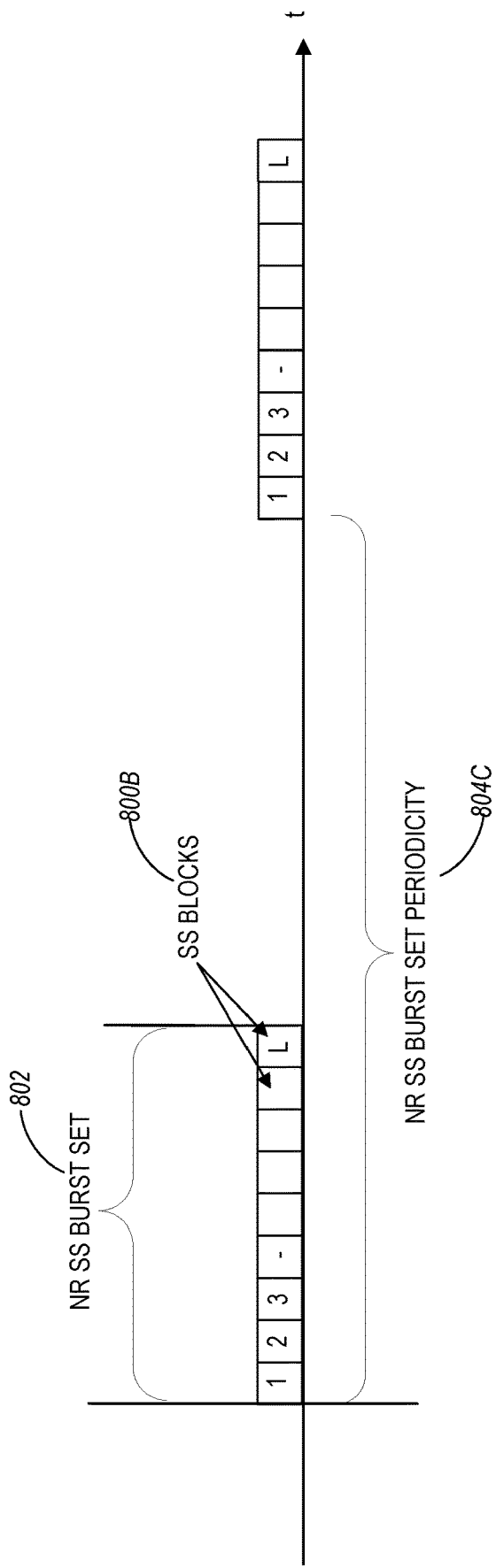
FIG. 8C illustrates an example SS block transmission in accordance with some aspects.

FIG. 8C illustrates an example SS block transmission in accordance with some aspects. Referring to FIG. 8C, there is illustrated another view of the SS burst set 802 which includes multiple SS blocks 800B. As seen in FIG. 8C, the SS burst set can have periodicity of 804C which is configured by higher layers.

Figure 9:
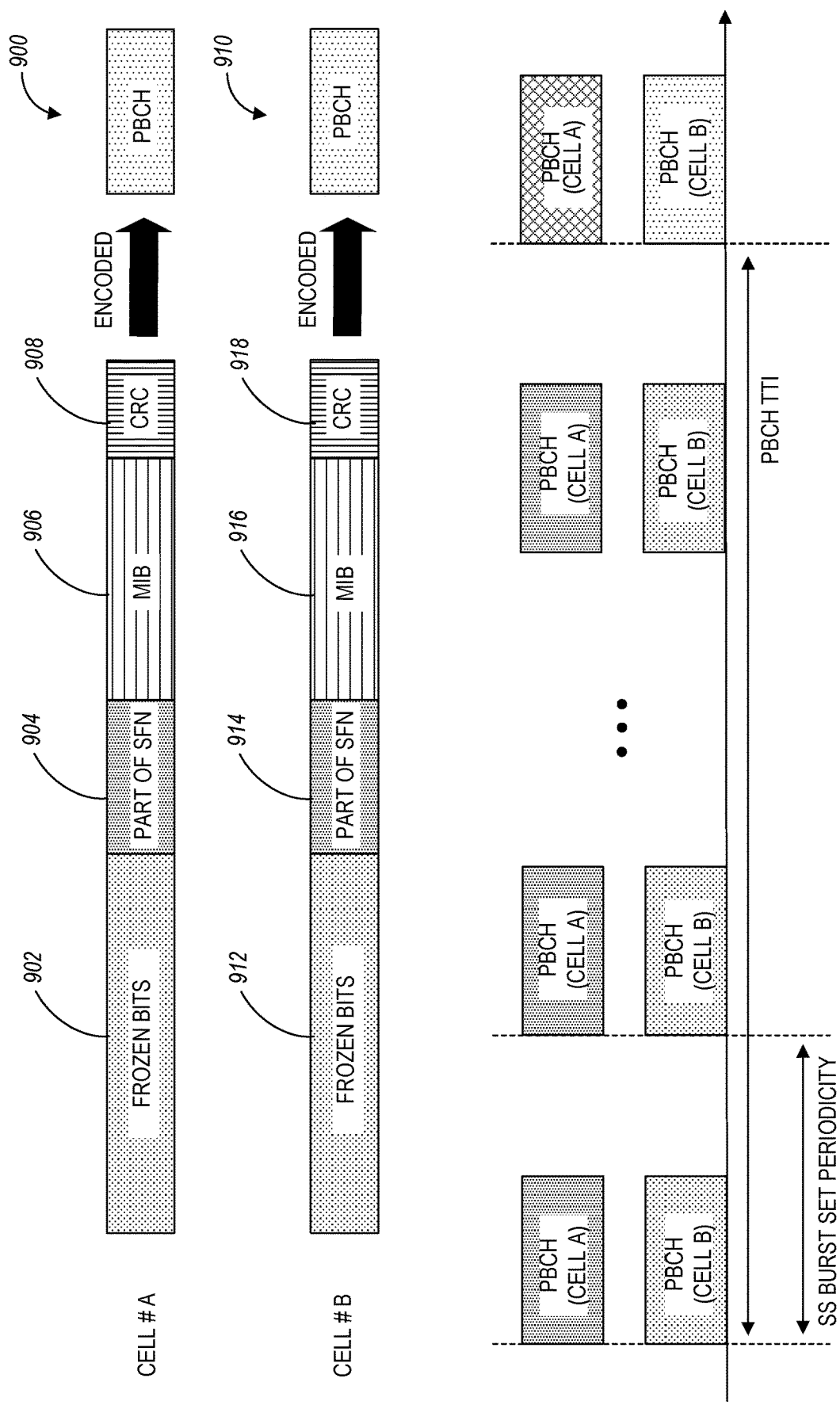
FIG. 9 is an illustration of encoding PBCH resources for multiple cells in accordance with some aspects.

FIG. 9 is an illustration of encoding PBCH resources for multiple cells in accordance with some aspects. Referring to FIG. 9, there is illustrated a PBCH transmission 900 associated with two cells—cell A and cell B. As seen in FIG. 9, each PBCH transmission can include one or more frozen bits, system frame number (SFN) information (which can be partial), a master information block (MIB), and cyclic redundancy check (CRC) information. The encoded PBCH content for both cell A and cell B can be transmitted over the PBCH transmission time interval (TTI). Since information within the PBCH TTI changes identically between cell A and cell B, in some aspects, the interference between cells is not randomized which can deteriorate soft combining of PBCH instances.

In some aspects associated with LTE communications, PBCH payload and CRC can be encoded and rate-matched such that the payload can fit four transmission instances of PBCH. A long scrambling code can be XOR masked to the encoded bits, and divided into four portions where each portion can be mapped to a single transmission instance of PBCH. In this regard, PBCH communication solutions used in LTE can be associated with more complex receivers as the UE does not know which of the four portions of the PBCH the UE has received at a PBCH transmission instance. Therefore, the UE may need to perform four different blind decodings with four different hypothesis. The blind decoding hypothesis can used even if the UE does not perform soft combining of PBCH transmissions. Techniques disclosed herein can be used to randomize the PBCH transmissions among cells so that PBCH interference in synchronous networks can be randomized, resulting in more efficient PBCH processing.

In some aspects, the techniques disclosed herein for PBCH randomization used linearity of polar codes and CRC as described herein below. In some aspects, polar codes can be linear, which means that two or more information fields that are added together prior to polar encoding is equivalent to two more information fields that are polar encoded separately and added together after encoding, where the addition is a modulus 2 addition. This concept is illustrated in greater detail in FIG. 10.

Figure 10:
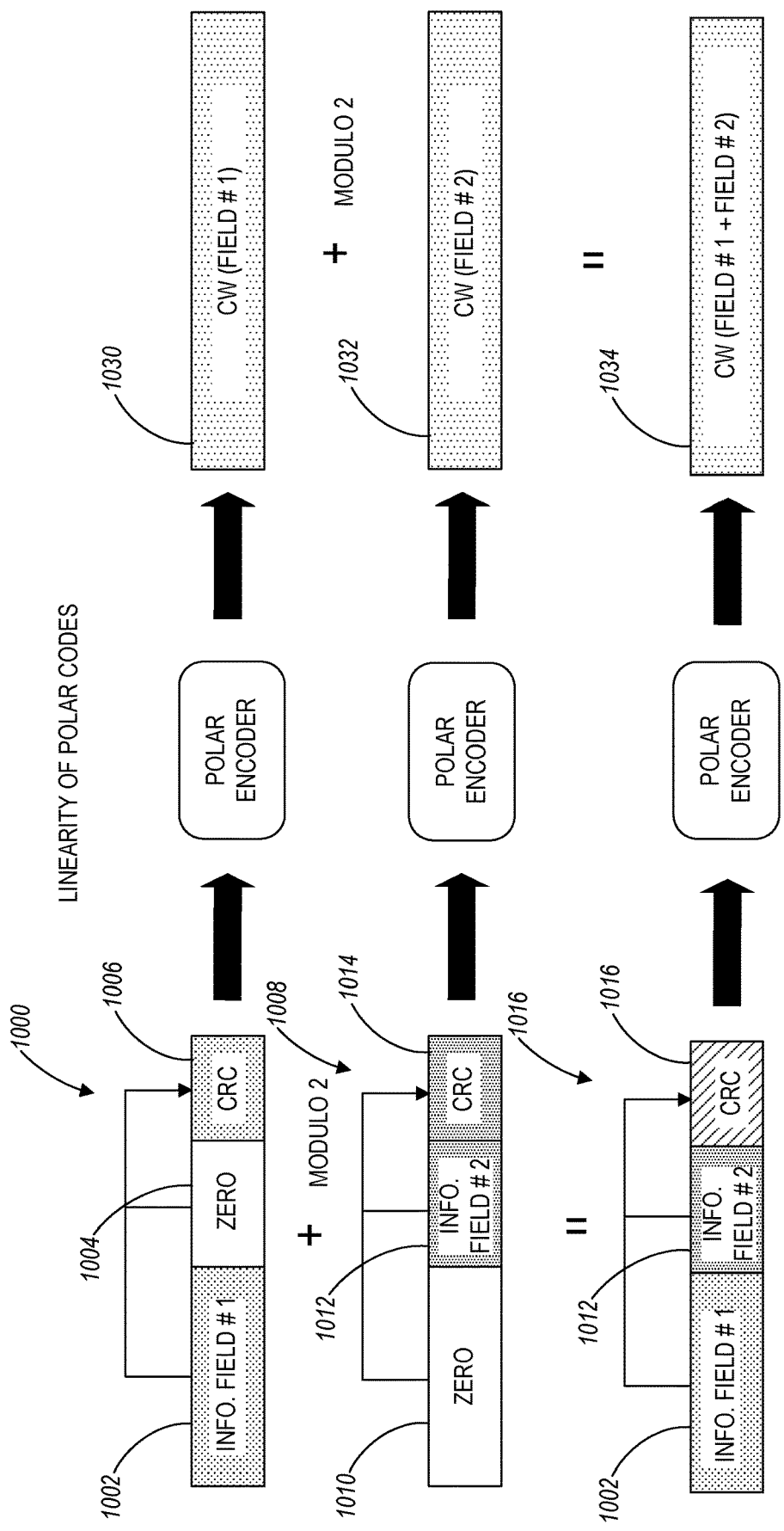
FIG. 10 illustrates linearity of polar codes in accordance with some aspects.

FIG. 10 illustrates linearity of polar codes in accordance with some aspects. More specifically, FIG. 10 illustrates an example of the polar linearity when information payload includes two information fields (field #1 and field #2) and a cyclic redundancy check (CRC) field. The CRC can be computed using the entirely of the information field (including zeros), which is possible as CRC computation is also linear. In some aspects, CRC computed with both fields is equivalent to CRC computed individually and added together later.

Referring to FIG. 10, information payload 1016 includes field #1 1002, field #2 1012, and CRC 1016. Payload #1 1000, which includes field #1 1002, set of zeros 1004 (bit width equal to field #2 1012), and CRC 1006, is encoded with polar encoder into codeword #1 1030. Payload #2 1008, which includes a set of zeros 1010 (bit width equal to field #1 1002), field #2 1012, and CRC 1014, is encoded with polar encoder into codeword #2 1032. Payload #3, which includes field #1 1002, field #2 1012, and CRC 1016, is encoded with polar encoder into codeword #3 1034. Payload #3 1016 can be equivalently generated by modulus 2 addition of payload #1 1000 and payload #2 1008. Additionally, codeword #3 1034 can be equivalently generated by modulus 2 addition of codeword #1 1030 and codeword #2 1032.

FIG. 11 through FIG. 15 disclosed techniques for generating randomized PBCH transmissions for a given cell.

Figure 11:
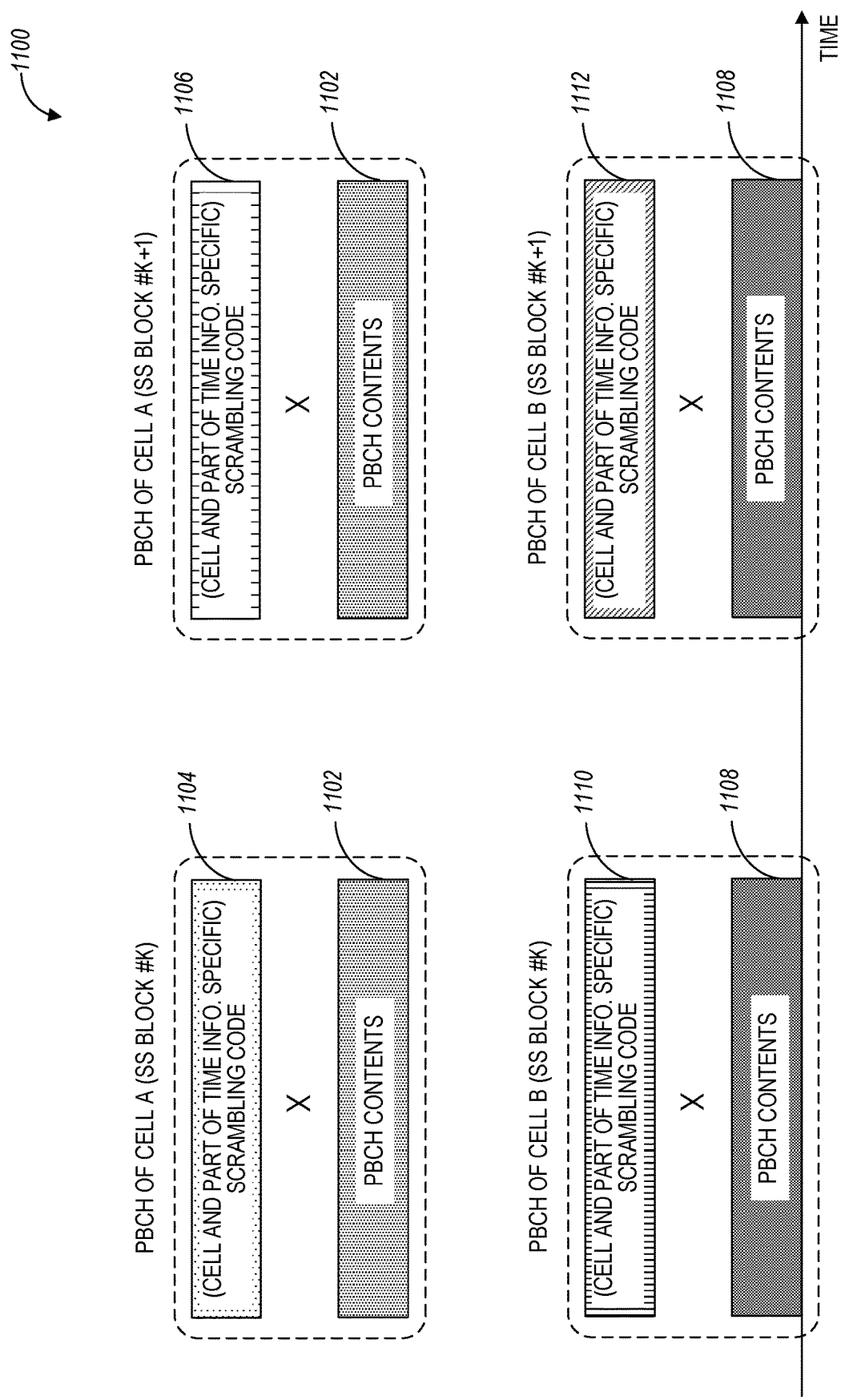
FIG. 11 illustrates application of scrambling code to encoded PBCH payload in accordance with some aspects.

FIG. 11 illustrates a first technique 1100 for applying scrambling code to encoded PBCH payload in accordance with some aspects. Referring to FIG. 11, in accordance with the first technique 1100, cell specific and part of time information specific scrambling code can be applied to the encoded and rate-matched PBCH payload. More specifically, encoded PBCH content 1102 can be used for cell A, and encoded PBCH content 1108 can be used for cell B. Scrambling codes 1104 and 1106 can include cell specific information associated with cell A as well as time information, and can be applied to the encoded PBCH content by modulus 2 addition or bitwise exclusive OR (XOR) operation. Similarly, scrambling codes 1110 and 1112 can include cell specific information associated with cell B as well as time information, and can be applied to the encoded PBCH content by modulus 2 addition or bitwise exclusive OR (XOR) operation.

Alternatively, application of the scramble codes 1104, 1106, 1110, and 1112 can be achieved by multiplication of binary phase shift keying (BPSK) or quadrature phase shift keying (QPSK) modulated scrambled code to the BPSK/ quadrature amplitude modulation (QAM) modulated encoded PBCH information sequence.

Figure 12:
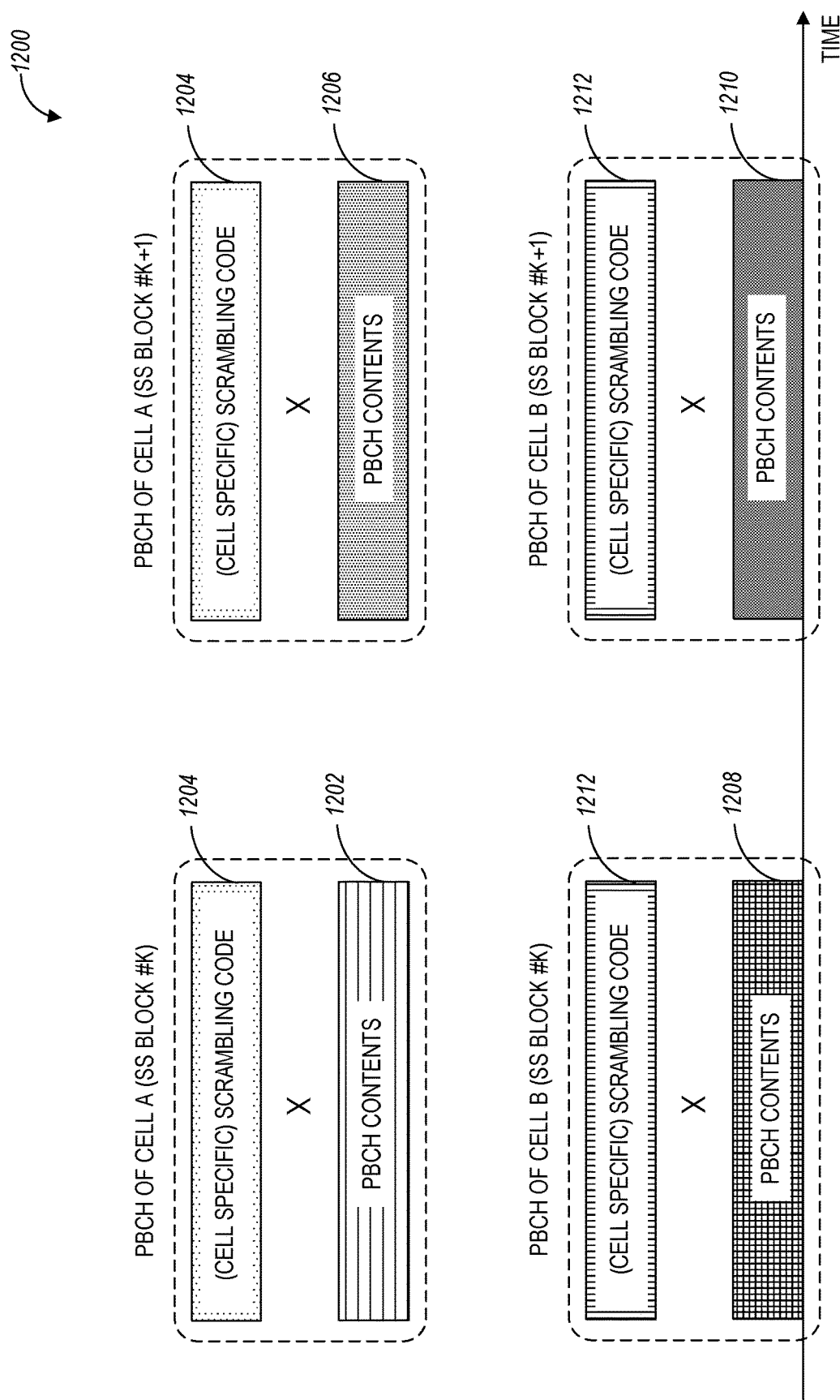
FIG. 12 illustrates application of scrambling code to PBCH payload prior to encoding in accordance with some aspects.

FIG. 12 illustrates a second technique 1200 for applying scrambling code to PBCH payload prior to encoding in accordance with some aspects. Referring to FIG. 12, in accordance with the second technique 1200, cell specific and part of time information specific scrambling code can be applied to the PBCH payload prior to encoding. As seen in FIG. 12, encoded PBCH content transmissions 1202 and 1206 for cell A are different from each other since cell specific and part of time information specific scrambling code has been applied prior to encoding. Similarly, PBCH content transmissions 1208 and 1210 for cell B are also different from each other since cell specific and part of time information specific scrambling code has been applied prior to encoding.

In some aspects, a cell specific scrambling code (e.g., 1204 for cell A and 1212 for cell B) can be applied to the final encoded and rate-matched PBCH payload (e.g., 1202 for cell A and 1208 for cell B). In some aspects, application of a scrambling code to a pre-encoded or post-encoded bit sequence can be performed by modulus 2 addition or bitwise XOR operation. Alternatively, application of a post-encoded scrambling code can be achieved by multiplication of BPSK or QPSK modulated scrambled code to the BPSK/QAM modulated encoded PBCH information sequence.

Figure 13:
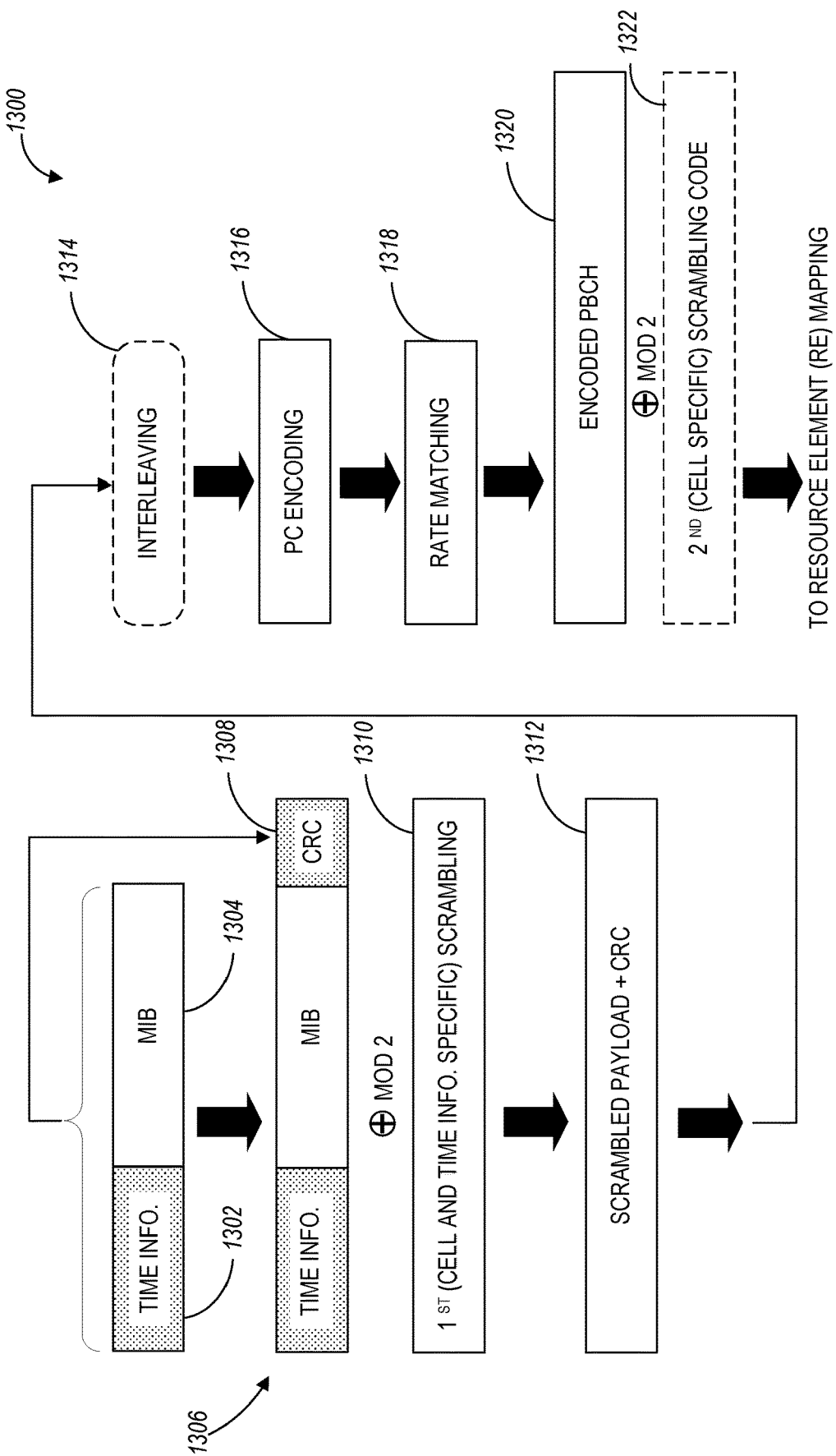
FIG. 13, FIG. 14, and FIG. 15 illustrate flow diagrams of methods for scrambling a PBCH in accordance with some aspects.
Figure 14:
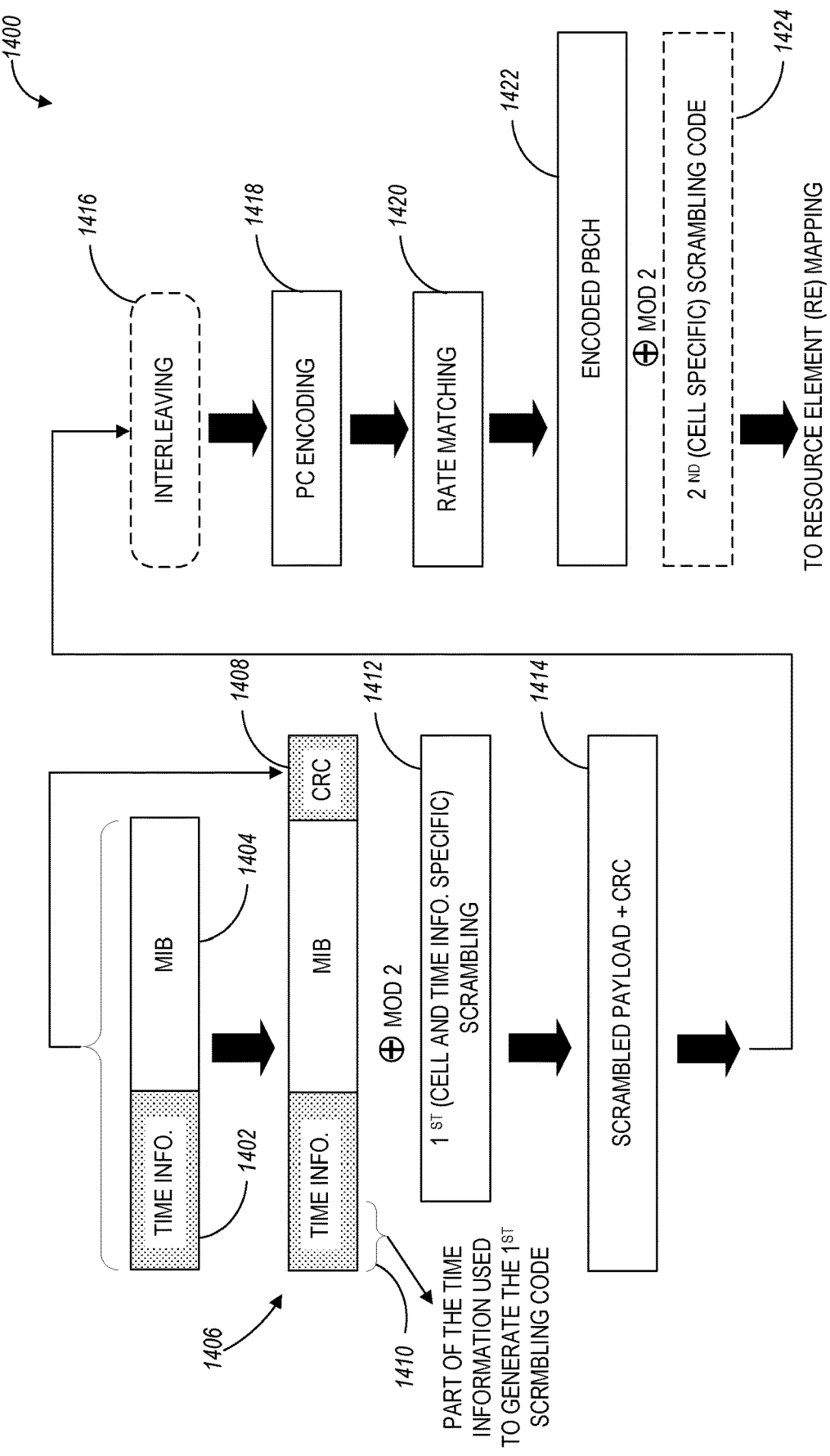
Figure 15:
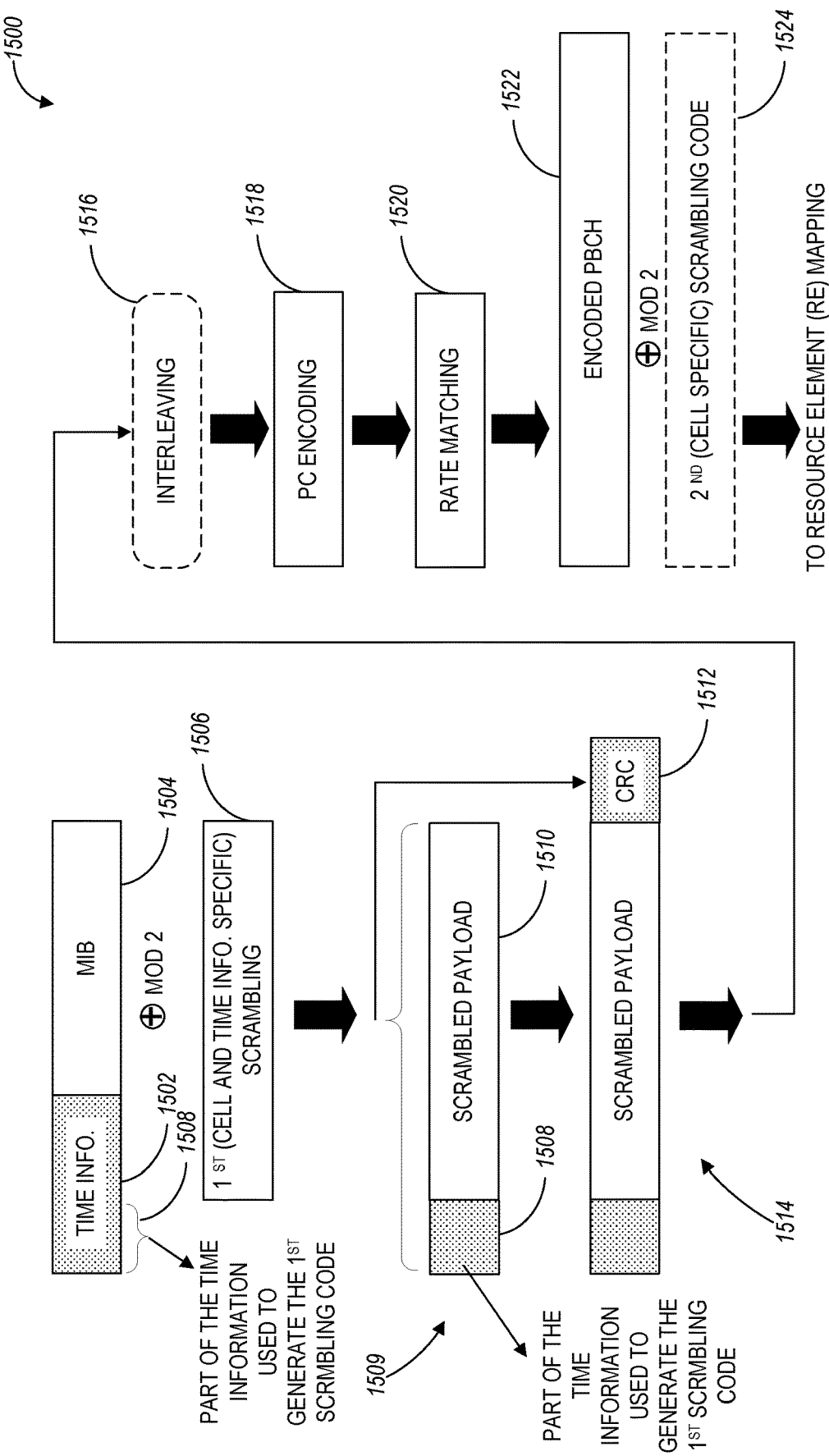

FIG. 13, FIG. 14, and FIG. 15 illustrate flow diagrams of methods for scrambling a PBCH in accordance with some aspects. More specifically, FIG. 13-FIG. 15 illustrate different methods for applying scrambling code prior to PBCH encoding associated with the second technique 1200.

Referring to FIG. 13, method 1300 can start by computing a CRC 1308 using PBCH information content such as time information 1302 and MIB information 1304. The time information 1302, MIB 1304, and CRC 1308 can form PBCH payload information 1306. The PBCH payload 1306 including CRC 1308 can be scrambled with the first scrambling code 1310 (which can be cell and time information specific). In some aspects, the scrambling operation can be performed by bitwise XOR or modulus 2 addition. The scrambled bit sequence 1312 can be interleaved at 1314, and encoded at 1316 using, e.g., polar codes. The encoded bits can be rate-matched at 1318 by bit extension, puncturing, and/or shortening to fit the available resources transmission. The rate-matched and encoded PBCH information 1320 can be scrambled by a second scrambling code 1322, modulated and mapped to time/frequency resource elements for transmission. In some aspects, the interleaving process 1314 and/or the encoding using the second scrambling code 1322 may be optional.

Referring to FIG. 14, method 1400 can start by computing a CRC 1408 using PBCH information content such as time information 1402 and MIB information 1404. The time information 1402, MIB 1404, and CRC 1408 can form PBCH payload information 1406. The PBCH payload 1406, which includes CRC 1408 but excludes a part 1410 of the time information signal 1402, is scrambled with the first scrambling code 1412 (which can be cell and time information specific code). In some aspects, the scrambling operation can be performed by bitwise XOR or modulus 2 addition. In some aspects, the excluded part 1410 of the time information signal 1402 from scrambling can be used to generate the first scrambling code 1412. The scrambled bit sequence 1414 can be interleaved at 1416, and encoded using polar codes at 1418. The encoded bits can be rate-matched at 1420 by bit extension, puncturing, and/or shortening to fit the available resources transmission. The rate-matched and encoded PBCH information 1422 can be scrambled by a second scrambling code 1424 (e.g., a cell-specific scrambling code), modulated and mapped to time/frequency resource elements for transmission. In some aspects, the interleaving process 1416 and/or the encoding using the second scrambling code 1424 may be optional.

In some aspects, the first scrambling code 1412 excluding to scramble a part 1410 of the time information signal 1402 can be implemented by generating a scrambling code that scrambles a bit sequence, where the scrambling code is zero for the bits that correspond to the part of the time information signal 1410 that is excluded from scrambling. Alternatively, a shorter scrambling code compared with the PBCH payload can be generated and applied, with the part 1410 of the time information signal not being scrambled.

Referring to FIG. 15, method 1500 can start by generating PBCH information including time information 1502 and MIB information 1504. The PBCH information, which excludes a part 1508 of the time information signal 1502 and CRC, is scrambled with the first scrambling code 1506 to generate scrambled payload 1510. The scrambling operation can be performed using bitwise XOR or modulus 2 addition. The excluded part 1508 of the time information signal 1502 from scrambling can be used to generate the first scrambling code 1506. The PBCH payload 1509 (i.e. both scrambled 1510 and no scrambled 1508 bit sequence) can be used to compute the cyclic redundancy check (CRC) 1512, and computed CRC 1512 can be appended to the PBCH payload 1509 to generate PBCH payload 1514.

The scrambled bit sequence can be interleaved at 1516, and encoded at 1518 using polar codes. The encoded bits can be rate-matched at 1520 by bit extension, puncturing, and/or shortening to fit the available resources for transmission. The rate-matched and encoded PBCH information 1522 can be scrambled by a second scrambling code 1524, modulated and mapped to time/frequency resource elements for transmission. In some aspects, the interleaving process 1516 and/or the encoding using the second scrambling code 1524 may be optional.

In some aspects, the first scrambling code 1506 excluding to scramble a part 1508 of the time information signal 1502 can be implemented by generating a scrambling code that scrambles a bit sequence, where the scrambling code is zero for the bits that correspond to the part 1508 of the time information signal 1502 that is excluded from scrambling. Alternatively, a shorter scrambling code compared with the PBCH payload can be generated and applied, with the part 1508 of the time information signal not being scrambled.

In some aspects, the following scrambling code generation techniques can be used generate the scrambling codes used for scrambling PBCH information in connection with the disclosed methods.

In some aspects, the first scrambling code described in connection with FIGS. 13-15 (i.e., code 1310, 1412, and 1506) can be generated using cell-specific information such as cell ID and time information signaling (or part of such signaling). In reference to codes 1412 and 1506, the part of the time information signaling is the part of the PBCH payload that does not get scrambled by the first scrambling code. In some aspects, the scrambling code can be generated using a PN sequence generator, such as M-sequences or Gold Codes. The initialization value of the PN sequence generator can be configured with the cell ID and the part of the time information signaling. Alternatively, the initialization value of the PN sequence generator can be configured with the cell ID and output of the PN sequence generator can be shifted by a value associated with the part of the time information signaling.

For example, c(n) could be the PN sequence generator based on length-31 Gold Code sequence. Sequence c(n) can be expressed as follows:

$$c(n)=(x_0(n+N_C)+x_1(n+N_C)) \bmod 2$$

$$x_0(n+31)=(x_0(n+3)+x_0(n)) \bmod 2$$

$$x_1(n+31)=(x_1(n+3)+x_1(n+2)+x_1(n+1)+x_1(n)) \bmod 2,$$

where initial value of sequence x0(n) and x1(n) can be expressed as follows:

$$x_0 = 1,$$
$$x_0(k) = 0, k = 1, 2, \ldots, 30$$
$$x_1(k) = \left\lfloor \frac{c_{init}}{2^k} \right\rfloor \bmod 2, k = 0, 1, \ldots, 30,$$

and $c_{init}$ is the initialization value.

In another aspect, c(n) can be the PN sequence generator based on a length-63 Gold Code sequence. Sequence c(n) can be expressed as follows:

$$c(n)=(x_0(n+N_C)+x_1(n+N_C)) \bmod 2$$

$$x_0(n+63)=(x_0(n+1)+x_0(n)) \bmod 2$$

$$x_1(n+63)=(x_1(n+42)+x_1(n+21)+x_1(n+1)+x_1(n)) \bmod 2,$$

where initial value of sequence x0(n) and x1(n) can be expressed as follows:

$$x_0 = 1,$$
$$x_0(k) = 0, k = 1, 2, \ldots, 62$$
$$x_1(k) = \left\lfloor \frac{c_{init}}{2^k} \right\rfloor \bmod 2, k = 0, 1, \ldots, 62,$$

and $c_{init}$ is the initialization value.

In another aspect, c(n) can be the PN sequence generator based on a length-63 Gold Code sequence. Sequence c(n) can be expressed as follows:

$$c(n)=(x_0(n+N_C)+x_1(n+N_C)) \bmod 2$$

$$x_0(n+63)=(x_0(n+1)+x_0(n)) \bmod 2$$

$$x_1(n+63)=(x_1(n+38)+x_1(n+13)+x_1(n+1)+x_1(n)) \bmod 2,$$

where initial value of sequence x0(n) and x1(n) can be expressed as follows:

$$x_0 = 1,$$
$$x_0(k) = 0, k = 1, 2, \ldots, 62$$
$$x_1(k) = \left\lfloor \frac{c_{init}}{2^k} \right\rfloor \bmod 2, k = 0, 1, \ldots, 62,$$

and $c_{init}$ is the initialization value.

In some aspects and in connection with the PN sequence generator examples listed above, Nc can be the output shift value. In some aspects, the output shift value can be a function of the part of the time information signaling, if the part of the time information signaling was not used as part of the initialization value.

In some aspects, the second scrambling code described in connection with FIGS. 13-15 (i.e., code 1322, 1424, and 1524) can be generated using cell-specific information such as a cell ID. The PN sequence examples described above can also be used for the scrambling code generator of the second scrambling code. In such case, the cell ID can be used to initialize the sequence generator.

Figure 16:
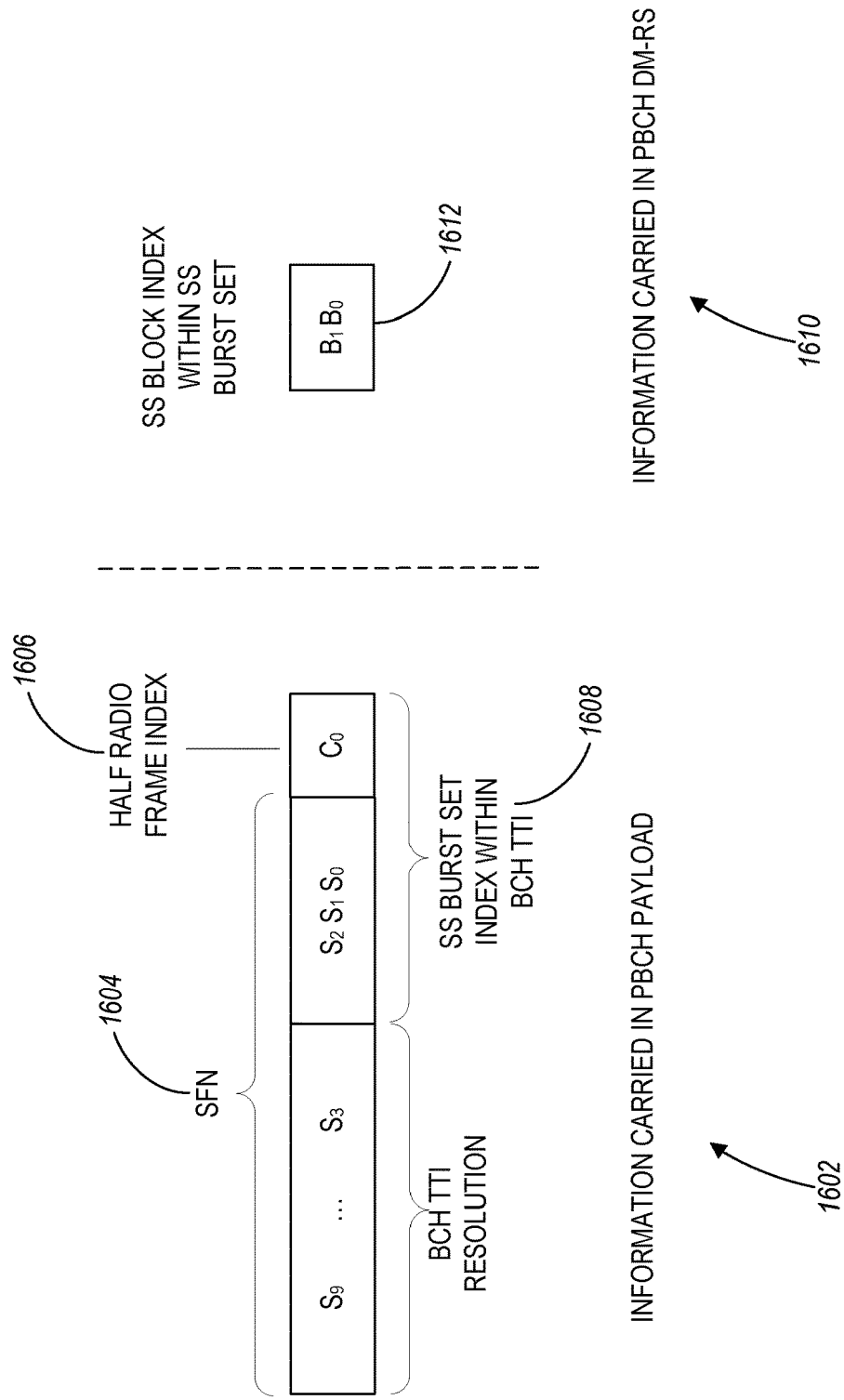
FIG. 16, FIG. 17, and FIG. 18 illustrate example partitions of time information signals in accordance with some aspects.
Figure 17:
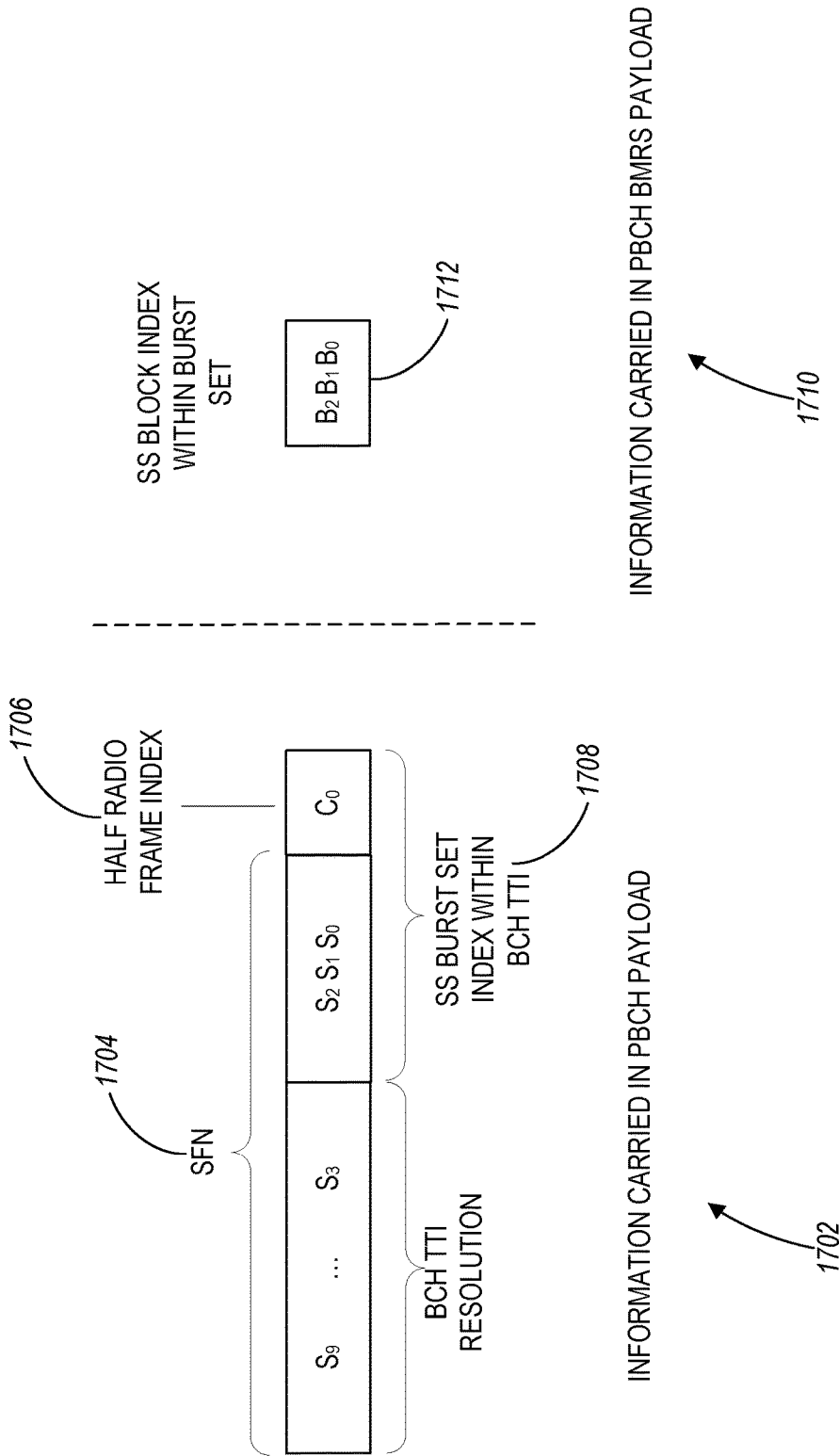
Figure 18:
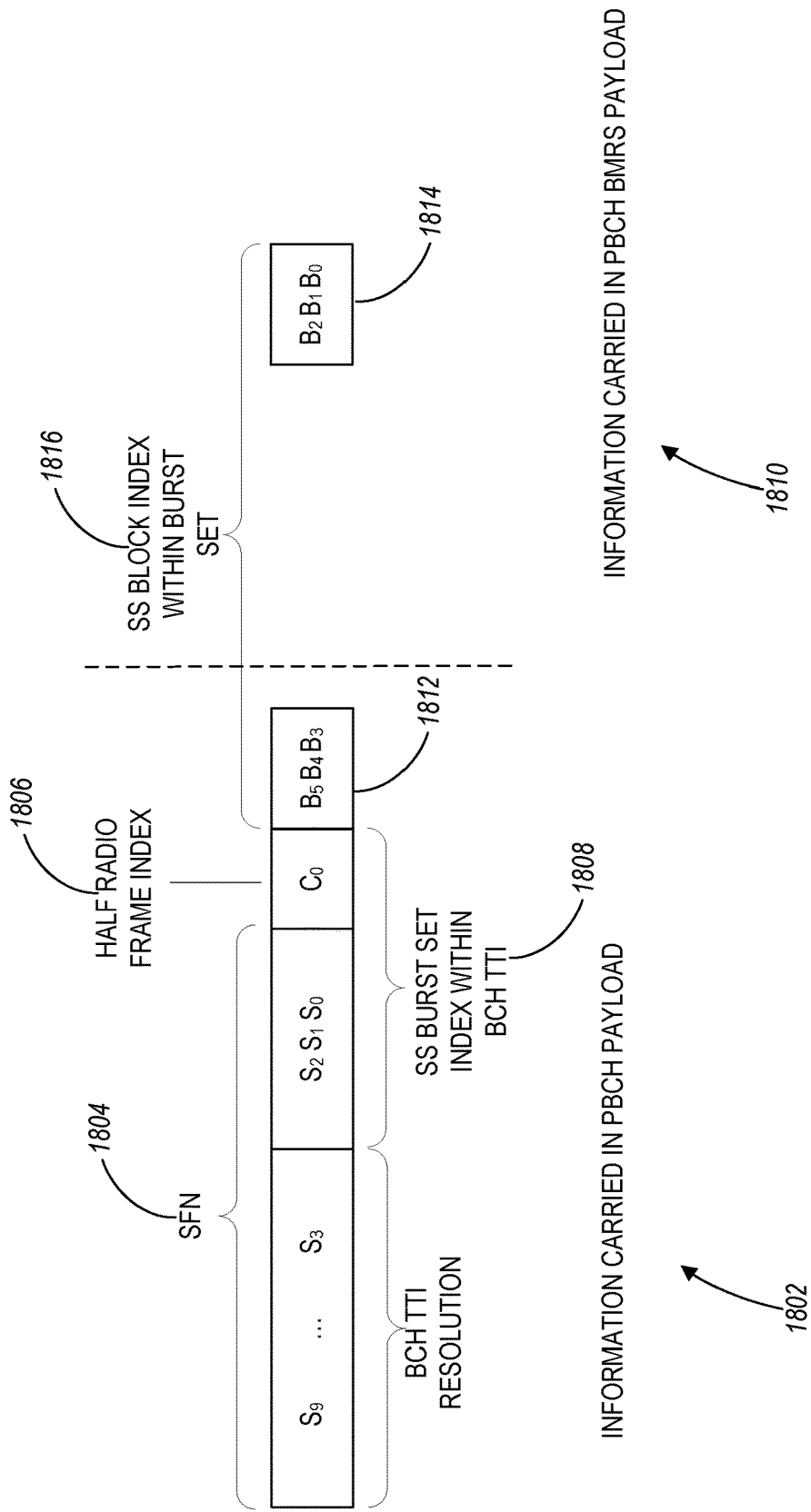

In some aspects, the time information signaling used in connection with PBCH scrambling techniques disclosed herein (e.g., 1302, 1402, and 1502) can include one or more of the examples discussed herein in connection with FIG. 16-FIG. 18. As used herein, the term "time information signaling" refers to the information field (or fields) that indicate one or more of the following: the system frame number (SFN) (i.e., radio frame number), half radio frame index, and synchronization signal (SS) block index within the SS burst set. The SS block index within the SS burst set can include 2 bits, 3 bits, or 6 bits, depending on the frequency carrier. In some aspects (and as illustrated in FIGS. 16-18), the time information signaling in PBCH can be split into two fields, where the first field can be carried as part of the PBCH payload and the second field can be carrier as part of the PBCH demodulation reference signal (DMRS) sequence.

FIG. 16, FIG. 17, and FIG. 18 illustrate example partitions of time information signals in accordance with some aspects. Referring to FIG. 16, there is illustrated time information signaling, which can include information 1602 carried in the PBCH payload and information 1610 carried in the PBCH DM-RS. More specifically, timing information 1602 in the PBCH payload can include SFN 1604 and half radio frame index 1606. A portion of the SFN 1604 and the half radio frame index 1606 can form the SS burst set index 1608. The timing information 1610 within the PBCH DM-RS can include the 2-bit SS block index 1612.

Referring to FIG. 17, there is illustrated time information signaling, which can include information 1702 carried in the PBCH payload and information 1710 carried in the PBCH DM-RS. More specifically, timing information 1702 in the PBCH payload can include SFN 1704 and half radio frame index 1706. A portion of the SFN 1704 (e.g., sequence $S_2S_1S_0$) and the half radio frame index 1706 can form the SS burst set index 1708 within the broadcast channel transmission time interval (BCH TTI). The timing information 1710 within the PBCH DM-RS can include the 3-bit SS block index 1712.

Referring to FIG. 18, there is illustrated time information signaling, which can include information 1802 carried in the PBCH payload and information 1810 carried in the PBCH DM-RS. More specifically, timing information 1802 in the PBCH payload can include SFN 1804, half radio frame index 1806, and a first portion (e.g., three bits) 1812 of the 6-bit SS block index 1816. A portion of the SFN 1804 (e.g., sequence $S_2S_1S_0$) and the half radio frame index 1806 can form the SS burst set index 1808 within the broadcast channel transmission time interval (BCH TTI). The timing information 1810 within the PBCH DM-RS can include a second portion (e.g., three bits) of the 6-bit SS block index 1816.

In some aspects, the part of the time information signaling used to generate the first scrambling code described in connection with FIGS. 13-15 (i.e., code 1310, 1412, and 1506) and not scrambled by the first scrambling code can correspond to the bits representing the SS burst set index (e.g., 1608, 1708, 1808) within the BCH TTI or a subset of such information. For example, the part of the time information can be bits S2 and S1 in the time information signaling shown in FIGS. 16-18.

In some aspects, the part of the time information signaling can be bits S2, S1, and S0 in the time information signaling shown in FIGS. 16-18.

In some aspects, the part of the time information signaling can be bits S2, S1, S0, and C0, in the time information signaling shown in FIGS. 16-18.

In some aspects, the part of the time information signaling used to generate the first scrambling code described in connection with FIGS. 13-15 (i.e., code 1310, 1412, and 1506) and not be scrambled by the first scrambling code can correspond to the bits representing the SS burst set index within the BCH TTI and SS block index carried by the DMRS sequence. This corresponds to subset of bits S2, S1, S0, and C0, and bits B2, B1, and B0 in the time information signaling shown in FIGS. 16-18.

In some aspects, the part of the time information signaling use to generate the first scrambling code described in connection with FIGS. 13-15 (i.e., code 1310, 1412, and 1506) and not be scrambled by the first scrambling code can correspond to the bits representing the SS burst set index within the BCH TTI and SS block index carried by the PBCH payload. This corresponds to subset of bits S2, S1, S0, and C0, and bits B6, B5, and B2 in the time information signaling shown in FIGS. 16-18.

In some aspects, the application of the first scrambling code can be replaced with an application of a bit permutation. A bit permutation pattern can be a function of the cell ID and part of the time information signaling. Alternatively, application of the first scrambling code be omitted and value permutation mapping of time information signaling can be performed. For example, the value mapped to S2, S1, and S0 bit fields can be permuted differently for each cell. For a first cell (e.g., cell #1), S2, S1, and S0 can increment in units of 1, resulting in bit sequence of {000, 001, 010, 011, 100, 101, 110, 111}. For a second cell (e.g., cell #2), S2, S1, and S0 can increment in units of 7, resulting in bit sequence of {000, 111, 110, 101, 100, 011, 010, 001}. Other cells could have a different bit sequence, such that each cell has a unique bit sequence. Additionally, other increment units can be used as well.

Figure 19:
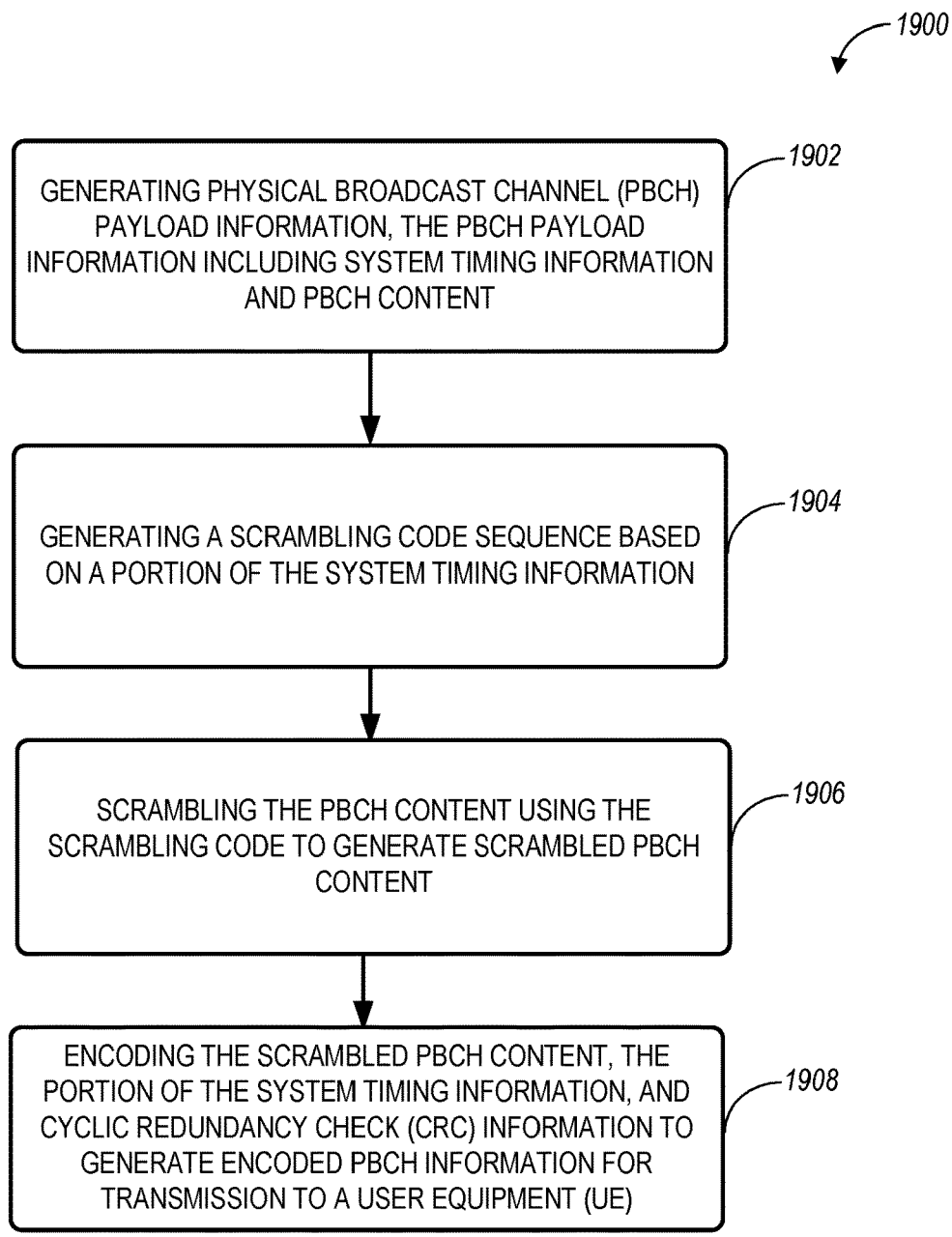
FIG. 19 illustrates generally a flowchart of example functionalities which can be performed in a wireless architecture in connection with PBCH scrambling, in accordance with some aspects.

FIG. 19 illustrates generally a flowchart of example functionalities which can be performed in a wireless architecture in connection with PBCH scrambling, in accordance with some aspects. Referring to FIG. 19, the example method 1900 can start at 1902, when physical broadcast channel (PBCH) payload information can be generated. The PBCH payload information can include system timing information (e.g., 1502) and PBCH content (e.g., MIB 1504). At 1904, a scrambling code sequence is generated based on a portion of the system timing information. For example, the scrambling code sequence 1506 can be generated using the portion 1508 of time information 1502. At 1906, the PBCH content can be scrambled using the scrambling code to generate scrambled PBCH content (e.g., 1510). At 1908, the scrambled PBCH content (e.g., 1510), the portion of the system timing information (e.g., 1508), and cyclic redundancy check (CRC) information (e.g., 1512) can be encoded (e.g., 1518) to generate encoded PBCH information for transmission to a user equipment (UE).

Figure 20:
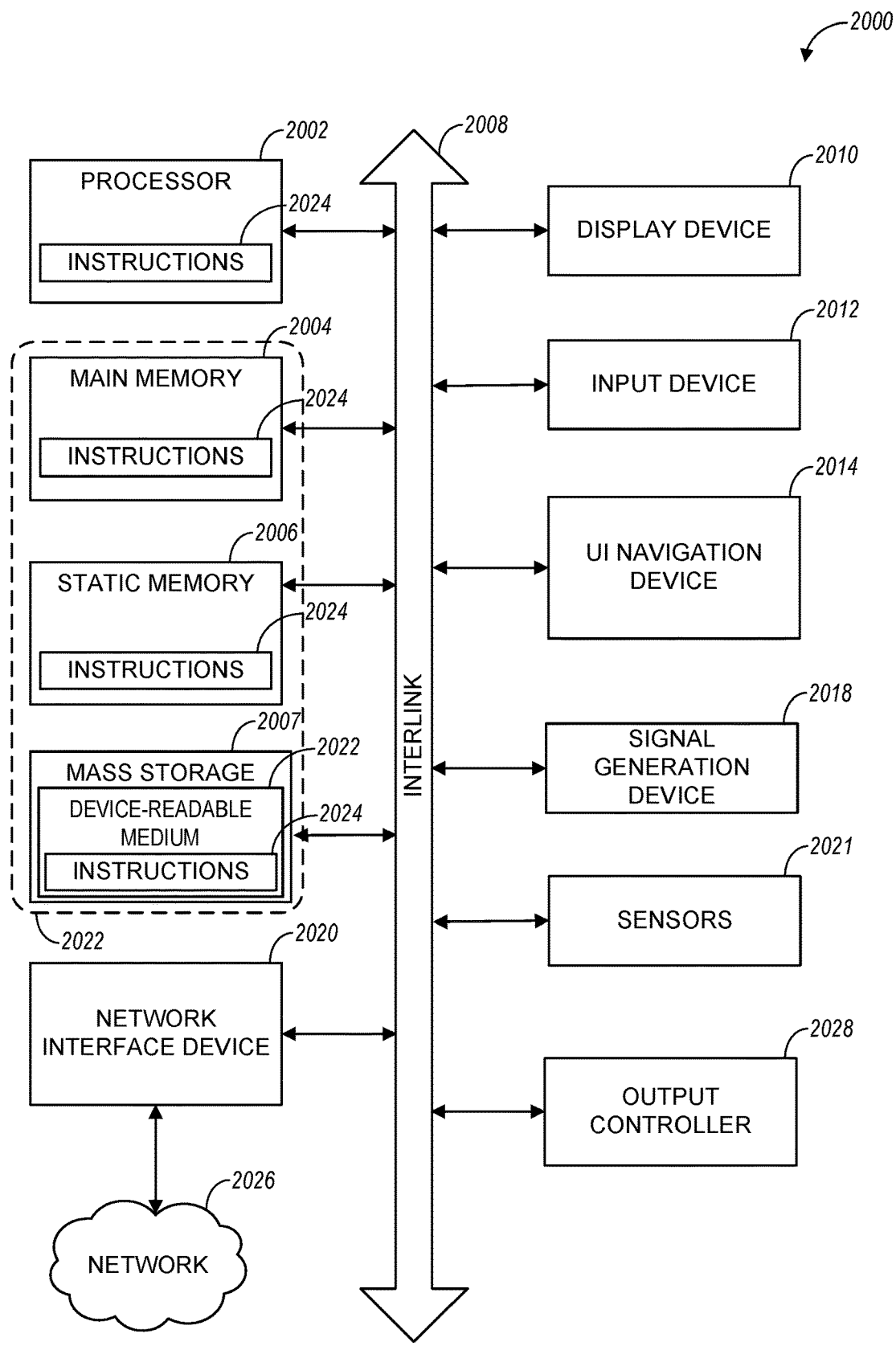
FIG. 20 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 20 illustrates a block diagram of a communication device such as an evolved Node-B (eNB), a new generation Node-B (gNB), an access point (AP), a wireless station (STA), a mobile station (MS), or a user equipment (UE), in accordance with some aspects. In alternative aspects, the communication device 2000 may operate as a standalone device or may be connected (e.g., networked) to other communication devices.

Circuitry (e.g., processing circuitry) is a collection of circuits implemented in tangible entities of the device 2000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 2000 follow.

In some aspects, the device 2000 may operate as a standalone device or may be connected (e.g., networked) to other devices. In a networked deployment, the communication device 2000 may operate in the capacity of a server communication device, a client communication device, or both in server-client network environments. In an example, the communication device 2000 may act as a peer communication device in peer-to-peer (P2P) (or other distributed) network environment. The communication device 2000 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 2000 may include a hardware processor 2002 (e.g., a central processing unit (CPU), a graphics processing unit (GPU), a hardware processor core, or any combination thereof), a main memory 2004, a static memory 2006, and mass storage 2007 (e.g., hard drive, tape drive, flash storage, or other block or storage devices), some or all of which may communicate with each other via an interlink (e.g., bus) 2008.

The communication device 2000 may further include a display device 2010, an alphanumeric input device 2012 (e.g., a keyboard), and a user interface (UI) navigation device 2014 (e.g., a mouse). In an example, the display device 2010, input device 2012 and UI navigation device 2014 may be a touch screen display. The communication device 2000 may additionally include a signal generation device 2018 (e.g., a speaker), a network interface device 2020, and one or more sensors 2021, such as a global positioning system (GPS) sensor, compass, accelerometer, or other sensor. The communication device 2000 may include an output controller 2028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2007 may include a communication device-readable medium 2022, on which is stored one or more sets of data structures or instructions 2024 (e.g., software) embodying or utilized by any one or more of the techniques or functions described herein. In some aspects, registers of the processor 2002, the main memory 2004, the static memory 2006, and/or the mass storage 2007 may be, or include (completely or at least partially), the device-readable medium 2022, on which is stored the one or more sets of data structures or instructions 2024, embodying or utilized by any one or more of the techniques or functions described herein. In an example, one or any combination of the hardware processor 2002, the main memory 2004, the static memory 2006, or the mass storage 2016 may constitute the device-readable medium 2022.

As used herein, the term "device-readable medium" is interchangeable with "computer-readable medium" or "machine-readable medium". While the communication device-readable medium 2022 is illustrated as a single medium, the term "communication device-readable medium" may include a single medium or multiple media (e.g., a centralized or distributed database, and/or associated caches and servers) configured to store the one or more instructions 2024.

The term "communication device-readable medium" may include any medium that is capable of storing, encoding, or carrying instructions (e.g., instructions 2024) for execution by the communication device 2000 and that cause the communication device 2000 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 2024 may further be transmitted or received over a communications network 2026 using a transmission medium via the network interface device 2020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2020 may include one or more physical jacks (e.g., Ethernet, coaxial, or phone jacks) or one or more antennas to connect to the communications network 2026. In an example, the network interface device 2020 may include a plurality of antennas to wirelessly communicate using at least one of single-input multiple-output (SIMO), MIMO, or multiple-input single-output (MISO) techniques. In some examples, the network interface device 2020 may wirelessly communicate using Multiple User MIMO techniques.

The term "transmission medium" shall be taken to include any intangible medium that is capable of storing, encoding or carrying instructions for execution by the communication device 2000, and includes digital or analog communications signals or other intangible medium to facilitate communication of such software. In this regard, a transmission medium in the context of this disclosure is a device-readable medium.

Additional Notes and Examples

Example 1 is an apparatus of a base station (BS), the apparatus comprising: processing circuitry, the processing circuitry configured to: generate physical broadcast channel (PBCH) payload information, the PBCH payload information including system timing information and PBCH content; generate a scrambling sequence based on a portion of the system timing information; scramble the PBCH payload using the scrambling sequence to generate scrambled PBCH payload, wherein scrambling bits of the scrambling sequence are set to 0 for the PBCH payload containing the portion of the system timing information; and encode the scrambled PBCH payload including the portion of the system timing information and cyclic redundancy check (CRC) information to generate encoded PBCH information for transmission to a user equipment (UE); and memory coupled to the processing circuitry, the memory configured to store the encoded PBCH information.

In Example 2, the subject matter of Example 1 includes, wherein the processing circuitry is further configured to: rate match the encoded PBCH information prior to transmission to the UE.

In Example 3, the subject matter of Examples 1-2 includes, wherein the processing circuitry is further configured to: scramble the encoded PBCH information prior to transmission to the UE using a second scrambling sequence, the second scrambling sequence based on cell-specific information associated with a cell of the BS.

In Example 4, the subject matter of Example 3 includes, wherein the cell-specific information is a cell ID of the cell.

In Example 5, the subject matter of Example 4 includes, wherein the processing circuitry is further configured to: initialize the scrambling sequence using the cell ID of the cell.

In Example 6, the subject matter of Examples 1-5 includes, wherein the scrambling sequence is a length-31 Gold sequence generated using two M-sequences.

In Example 7, the subject matter of Examples 1-6 includes, wherein the time information signaling includes one or more of the following: a system frame number (SFN); a half radio frame index; and one or more bits of a synchronization signal block index.

In Example 8, the subject matter of Example 7 includes, wherein the portion of the system timing information for generating the scrambling sequence includes one or more bits of the SFN.

In Example 9, the subject matter of Examples 7-8 includes, wherein the portion of the system timing information for generating the scrambling sequence includes a second and third least significant bit (LSB) of the SFN.

In Example 10, the subject matter of Examples 1-9 includes, wherein the processing circuitry is further configured to: interleave the scrambled PBCH content, the portion of the system timing information, and the CRC information prior to encoding.

In Example 11, the subject matter of Examples 1-10 includes, wherein the PBCH content comprises master information block (MIB) signaling.

In Example 12, the subject matter of Examples 1-11 includes, transceiver circuitry coupled to the processing circuitry; and, one or more antennas coupled to the transceiver circuitry.

In Example 13, the subject matter of Examples 1-12 includes, wherein the base station is a Next Generation Node-B (gNB) or an evolved Node-B (eNB).

Example 14 is an apparatus of a user equipment (UE), the apparatus comprising: processing circuitry, the processing circuitry configured to: decode physical broadcast channel (PBCH) information received from a base station (BS), the decoded PBCH information comprising a scrambled PBCH payload and an unscrambled bit sequence; generate a scrambling sequence based on time information signaling within the unscrambled bit sequence; de-scramble the scrambled PBCH payload using the scrambling sequence, to obtain master information block (MIB) information; and decode system information block (SIB) information based on the MIB information; and memory coupled to the processing circuitry, the memory configured to store the MIB information and the SIB information.

In Example 15, the subject matter of Example 14 includes, wherein the decoded PBCH information comprises cyclic redundancy check (CRC) information, and wherein the processing circuitry is further configured to: verify the scrambled PBCH payload and the unscrambled bit sequence based on the CRC information.

In Example 16, the subject matter of Examples 14-15 includes, wherein the time information signaling includes one or more bits of a system frame number (SFN).

In Example 17, the subject matter of Examples 14-16 includes, wherein the processing circuitry is further configured to: generate the scrambling sequence as a length-31 Gold sequence, based on two M-sequences.

In Example 18, the subject matter of Example 17 includes, wherein the processing circuitry is further configured to: initialize the scrambling sequence using a cell identity of a cell of the BS.

In Example 19, the subject matter of Examples 14-18 includes, transceiver circuitry coupled to the processing circuitry; and, one or more antennas coupled to the transceiver circuitry.

Example 20 is a computer-readable storage medium that stores instructions for execution by one or more processors of a next generation Node-B (gNB), the instructions to configure the one or more processors to cause the gNB to: generate physical broadcast channel (PBCH) payload information, the PBCH payload information including system timing information and PBCH content; generate a scrambling sequence based on a portion of the system timing information; scramble the PBCH payload using the scrambling sequence to generate scrambled PBCH payload, wherein scrambling bits for scrambling the portion of the system timing information within the PBCH payload are set to 0; and encode the scrambled PBCH payload including the portion of the system timing information, and cyclic redundancy check (CRC) information to generate encoded PBCH information for transmission to a user equipment (UE).

In Example 21, the subject matter of Example 20 includes, wherein the instructions further configure the one or more processors to cause the gNB to: rate match the encoded PBCH information prior to transmission to the UE.

In Example 22, the subject matter of Examples 20-21 includes, wherein the instructions further configure the one or more processors to cause the gNB to: scramble the encoded PBCH information prior to transmission to the UE using a second scrambling sequence, the second scrambling sequence based on cell-specific information associated with a cell of the gNB.

In Example 23, the subject matter of Example 22 includes, wherein the cell-specific information is a cell ID of the cell and wherein the instructions further configure the one or more processors to cause the gNB to: initialize the scrambling sequence using the cell ID of the cell.

In Example 24, the subject matter of Examples 20-23 includes, wherein the scrambling sequence is a length-31 Gold sequence generated using two M-sequences.

In Example 25, the subject matter of Examples 20-24 includes, wherein the time information signaling includes one or more of the following: a system frame number (SFN); a half radio frame index; and one or more bits of a synchronization signal block index.

In Example 26, the subject matter of Example 25 includes, wherein the portion of the system timing information for generating the scrambling sequence includes one or more bits of the SFN.

In Example 27, the subject matter of Example 26 includes, wherein the portion of the system timing information for generating the scrambling sequence includes a second and third least significant bit (LSB) of the SFN.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. A non-transitory computer readable medium (NTCRM), comprising:
   program instructions configured to cause a user equipment (UE) to:
   receive, from a base station (BS), physical broadcast channel (PBCH) information, the PBCH information comprising a PBCH payload, the PBCH payload including a portion of system timing information and cyclic redundancy check (CRC) information; and
   decode the PBCH information, wherein the PBCH payload is scrambled by a scrambling sequence, wherein scrambling bits of the scrambling sequence are set to 0 for the PBCH payload comprising the portion of the system timing information and excludes the portion of the system timing information from scrambling, wherein the scrambling sequence is based on the portion of the system timing information, wherein the PBCH payload includes the system timing information.

2. The NTCRM of claim 1, wherein second timing information, not included in the system timing information, is carried on a PBCH demodulation reference signal (DMRS).

3. The NTCRM of claim 2, wherein the second timing information is 2 or 3 bits of a synchronization signal block index.

4. The NTCRM of claim 1, wherein the PBCH information is further scrambled with a second scrambling sequence based on cell-specific information associated with a cell of the BS.

5. The NTCRM of claim 4, wherein the cell-specific information is a cell ID of the cell.

6. The NTCRM of claim 1, wherein the scrambling sequence is a length-31 Gold sequence generated using two M-sequences.

7. The NTCRM of claim 1, wherein the system timing information includes one or more of the following:
   a system frame number, SFN;
   a half radio frame index; and
   one or more bits of a synchronization signal block index.

8. The NTCRM of claim 1, wherein the PBCH payload comprises master information block (MIB) signaling.

9. A method, comprising:
   obtaining a physical broadcast channel (PBCH) payload including a portion of system timing information;
   scrambling the PBCH payload by a scrambling sequence, wherein scrambling bits of the scrambling sequence are set to 0 for the PBCH payload comprising the portion of the system timing information and excludes the portion of the system timing information from scrambling, wherein the scrambling sequence is based on the portion of the system timing information, wherein the PBCH payload includes the system timing information;
   appending cyclic redundancy check (CRC) information to the PBCH payload to obtain PBCH information; and
   encoding the PBCH information for transmission.

10. The method of claim 9, wherein second timing information, not included in the system timing information, is carried on a PBCH demodulation reference signal (DMRS).

11. The method of claim 10, wherein the second timing information is 2 or 3 bits of a synchronization signal block index.

12. The method of claim 9, wherein the PBCH information is further scrambled with a second scrambling sequence based on cell-specific information associated with a cell.

13. The method of claim 12, wherein the cell-specific information is a cell ID of the cell.

14. The method of claim 9, wherein the scrambling sequence is a length-31 Gold sequence generated using two M-sequences.

15. The method of claim 9, wherein the system timing information includes one or more of the following:
- a system frame number, SFN;
- a half radio frame index; and
- one or more bits of a synchronization signal block index.

16. The method of claim 9, wherein the PBCH payload information comprises master information block (MIB) signaling.

17. A method, comprising:
- receiving, from a base station (BS), physical broadcast channel (PBCH) information, the PBCH information comprising a PBCH payload, the PBCH payload including a portion of system timing information and cyclic redundancy check (CRC) information; and
- decoding the PBCH information, wherein the PBCH payload is scrambled by a scrambling sequence, wherein scrambling bits of the scrambling sequence are set to 0 for the PBCH payload comprising the portion of the system timing information and excludes the portion of the system timing information from scrambling, wherein the scrambling sequence is based on the portion of the system timing information, wherein the PBCH payload includes the system timing information.

18. The method of claim 17, wherein second timing information, not included in the system timing information, is carried on a PBCH demodulation reference signal (DMRS).

19. The method of claim 18, wherein the second timing information is 2 or 3 bits of a synchronization signal block index.

20. The method of claim 17, wherein other scrambling bits of the scrambling sequence are not set to 0 for other portions of the PBCH payload.

* * * * *